(12) United States Patent
Zhou

(10) Patent No.: US 10,239,127 B2
(45) Date of Patent: Mar. 26, 2019

(54) LOCKING CHUCK

(71) Applicants: APEX BRANDS, INC., Apex, NC (US); JACOBS CHUCK MANUFACTURING (SUZHOU) COMPANY, LTD., Suzhou (CN)

(72) Inventor: Jichun Zhou, Suzhou (CN)

(73) Assignee: JACOBS CHUCK MANUFACTURING (SUZHOU) COMPANY, LTD., Suzhou (CN)

( * ) Notice: Subject to any disclaimer, the term of this patent is extended or adjusted under 35 U.S.C. 154(b) by 0 days.

(21) Appl. No.: 15/751,630

(22) PCT Filed: Aug. 12, 2015

(86) PCT No.: PCT/CN2015/086734
§ 371 (c)(1),
(2) Date: Feb. 9, 2018

(87) PCT Pub. No.: WO2017/024544
PCT Pub. Date: Feb. 16, 2017

(65) Prior Publication Data
US 2018/0236565 A1    Aug. 23, 2018

(51) Int. Cl.
*B23B 31/12* (2006.01)

(52) U.S. Cl.
CPC ........ *B23B 31/123* (2013.01); *B23B 31/1238* (2013.01); *B23B 2231/38* (2013.01);
(Continued)

(58) Field of Classification Search
CPC ............... B23B 31/123; B23B 31/1238; Y10T 279/17615; Y10T 279/17623; Y10T 279/17632
See application file for complete search history.

(56) References Cited

U.S. PATENT DOCUMENTS

| 5,765,839 | A | 6/1998 | Rohm |
| 6,390,481 | B1 | 5/2002 | Nakamuro |

(Continued)

FOREIGN PATENT DOCUMENTS

| CN | 2582790 Y | 10/2003 |
| CN | 2808373 Y | 8/2006 |

(Continued)

OTHER PUBLICATIONS

International Search Report and Written Opinion of PCT/CN2015/086734 dated May 24, 2016, all enclosed pages cited.

(Continued)

*Primary Examiner* — Eric A Gates
(74) *Attorney, Agent, or Firm* — Burr Forman McNair

(57) ABSTRACT

A chuck has a body (14). A plurality of first teeth (96) are rotationally fixed to the body. At least one second tooth (100) opposes the first teeth. The first teeth and the at least one second tooth are configured so that engagement of the first teeth and the at least one second tooth prevents relative rotation between a nut (16) and the body in an opening direction. A sleeve (18) defines a notch (90*b*) that engages a spring (29) so that in a relative rotational position between the sleeve and the nut, the notch receives the spring so that the notch resists relative rotational movement between the sleeve and the spring in the opening direction of the chuck.

18 Claims, 13 Drawing Sheets

(52) U.S. Cl.
CPC .... *Y10S 279/902* (2013.01); *Y10T 279/17632* (2015.01); *Y10T 279/32* (2015.01)

(56) References Cited

U.S. PATENT DOCUMENTS

| | | | | |
|---|---|---|---|---|
| 6,517,088 | B1* | 2/2003 | Rohm | B23B 31/123 279/140 |
| 6,824,141 | B1* | 11/2004 | Sakamaki | B23B 31/123 279/140 |
| 6,843,485 | B2* | 1/2005 | Sakamaki | B23B 31/123 279/140 |
| 6,959,931 | B2* | 11/2005 | Sakamaki | B23B 31/123 279/140 |
| 7,185,895 | B2* | 3/2007 | Cachod | B23B 31/123 279/140 |
| 7,360,770 | B2* | 4/2008 | Luckenbaugh | B23B 31/123 279/140 |
| 7,527,273 | B2* | 5/2009 | Bordeianu | B23B 31/123 279/140 |
| 7,654,539 | B2* | 2/2010 | Yang | B23B 31/123 279/125 |
| 9,016,699 | B2* | 4/2015 | Sakamaki | B23B 31/123 279/62 |
| 9,718,134 | B2* | 8/2017 | Schenk | B23B 31/1238 |
| 10,092,960 | B2* | 10/2018 | Nakamura | B23B 31/123 |
| 2006/0208435 | A1 | 9/2006 | Rohm | |
| 2007/0052182 | A1 | 3/2007 | Bordeianu | |
| 2007/0235951 | A1 | 10/2007 | Mack | |
| 2008/0136124 | A1 | 6/2008 | Tan | |
| 2008/0217869 | A1 | 9/2008 | Mack | |
| 2014/0300063 | A1 | 10/2014 | Bordeianu | |

FOREIGN PATENT DOCUMENTS

| | | | |
|---|---|---|---|
| CN | 201776466 U | 3/2011 | |
| EP | 1043100 A1 | 10/2000 | |
| EP | 1419837 A1 * | 5/2004 | ........... B23B 31/123 |
| FR | 2857284 A1 * | 1/2005 | ......... B23B 31/1238 |
| WO | 2008092300 A1 | 8/2008 | |

OTHER PUBLICATIONS

Extended Search Report and Written Opinion of corresponding European application No. 15900742.6 dated Nov. 7, 2018, all enclosed pages cited.

* cited by examiner

LOCKING CHUCK

FIELD OF THE INVENTION

The present invention relates generally to chucks for use with drills or other electric or pneumatic power drivers. More particularly, the present invention relates to a chuck of keyless type that may be tightened or loosened by hand or by actuation of the driver motor.

BACKGROUND OF THE INVENTION

Both hand and electric or pneumatic tool drivers are well known. Although twist drills are the most common tools on such drivers, the tools may also comprise screwdrivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways contain three jaws that are movable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the driveshaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673, 5,193,824, 6,390,481, 7,722,054, 8,616,561, and U.S. published application no. 2014/0203525, the entire disclosures of each of which are incorporated by reference herein for all purposes. Various configurations of keyless chucks are known in the art and are desirable for a variety of applications.

The present disclosure recognizes and addresses the foregoing considerations, and others, of prior art constructions and methods.

SUMMARY OF THE INVENTION

In one embodiment of a chuck for use with a manual or powered driver having a rotatable drive shaft, the chuck has a body configured to rotate with the drive shaft and having an axial bore formed therein centered about an axis of the body. A plurality of first teeth are rotationally fixed to the body. A plurality of jaws are movably disposed with respect to the body in communication with the axial bore. An annular nut has threads formed thereon in engagement with threads on the jaws so that rotation of the nut about the body and the axis in a closing direction moves the jaws toward the axis and rotation of the nut about the body and the axis in an opening direction, opposite the closing direction, moves the jaws away from the axis. A spring assembly comprises a first annular spring and a second annular spring. The first annular spring is rotationally fixed to the nut and has a body that biases a first distal end of the first annular spring in a radial direction with respect to the axis and that extends over an angular width about the axis that is greater than 180° in a plane perpendicular to the axis. The first annular spring defines at least one second tooth at the first distal end opposing the first teeth. The second annular spring is rotationally fixed to the nut and has a body that biases a second distal end of the second annular spring in a radial direction with respect to the axis and that extends over an angular width about the axis that is greater than 180° in a plane perpendicular to the axis. A hand actuatable sleeve that surrounds the body, the first annular spring, and the second annular spring about the axis engages the nut so that the sleeve rotationally drives the nut in the opening and closing directions and so that the sleeve is rotatable with respect to the nut over a limited arc between first and second relative rotational positions. The sleeve defines a cam surface that engages the first spring so that in the first relative rotational position between the sleeve and the nut, the first teeth and the at least one second tooth are disengaged and so that in the second relative rotational position between the sleeve and the nut, the first teeth and the at least one second tooth are engaged. The first teeth and the at least one second tooth are configured so that engagement of the first teeth and the at least one second tooth prevents relative rotation between the nut and the body in the opening direction. The sleeve defines a notch that engages the second spring so that in the second relative rotational position between the sleeve and the nut, the notch receives the second distal end so that the notch resists relative rotational movement between the sleeve and the second spring in the opening direction.

In another embodiment of a chuck for use with a manual or powered driver having a rotatable drive shaft, the chuck has a body configured to rotate with the drive shaft and having an axial bore formed therein centered about an axis of the body. A plurality of first teeth are rotationally fixed to the body. A plurality of jaws are movably disposed with respect to the body in communication with the axial bore. An annular nut has threads formed thereon in engagement with threads on the jaws so that rotation of the nut about the body and the axis in a closing direction moves the jaws toward the axis and rotation of the nut about the body and the axis in an opening direction, opposite the closing direction, moves the jaws away from the axis. A spring assembly rotationally fixed to the nut has at least one second tooth that opposes the first teeth and biases the at least one second tooth in a radial direction with respect to the axis. The spring assembly biases an end of the spring assembly in a radial direction with respect to the axis. A hand actuatable sleeve surrounds the body and the spring assembly about the axis and engages the nut so that the sleeve rotationally drives the nut in the opening and closing directions and so that the sleeve is rotatable with respect to the nut over a limited arc between first and second relative rotational positions. The sleeve defines a cam surface that engages the spring assembly so that in the first relative rotational position between the sleeve and the nut, the first teeth and the at least one second tooth are disengaged and so that in the second relative rotational position between the sleeve and the nut, the first teeth and the at least one second tooth are engaged. The first teeth and the at least one second tooth are configured so that engagement of the first teeth and the at least one second tooth prevents relative rotation between the nut and the body in the opening direction. The sleeve defines a notch that engages the spring assembly so that in the second relative rotational position between the sleeve and the nut, the notch receives the end of the spring assembly so that the notch resists relative rotational movement between the sleeve and the spring assembly in the opening direction. The nut has a plurality of dogs that extend into respective recesses in the sleeve. The angular width of the dogs, about the axis in a plane perpendicular to the axis, is less than the angular width of the respective recesses so that the difference in angular width between the dogs and the respective recesses defines the limited arc. The sleeve has a polymer portion and a metal portion received at a surface of the polymer portion that faces radially inward with respect to the axis, wherein the metal portion defines at least part of the respective recesses.

In a still further embodiment, a chuck for use with a manual or powered driver having a rotatable drive shaft has a body configured to rotate with the drive shaft and having an axial bore formed therein centered about an axis of the body. A plurality of first teeth are rotationally fixed to the body. A plurality of jaws are movably disposed with respect to the body in communication with the axial bore. An annular nut has threads formed thereon in engagement with threads on the jaws so that rotation of the nut about the body and the axis in a closing direction moves the jaws toward the axis and rotation of the nut about the body and the axis in an opening direction, opposite the closing direction, moves the jaws away from the axis. A spring assembly comprises a first annular spring and a second annular spring. The first annular spring is rotationally fixed to the nut by a dog that extends from the nut and cooperates with a groove in the first spring, the first spring having a body that biases a first distal end of the first annular spring in a radial direction with respect to the axis and that extends over an angular width about the axis that is greater than 180° in a plane perpendicular to the axis. The first annular spring defines at least one second tooth at the first distal end opposing the first teeth. The second annular spring is rotationally fixed to the nut by the dog that cooperates with a groove in the second spring. The second spring has a body that biases a second distal end of the second annular spring in a radial direction with respect to the axis and that extends over an angular width about the axis that is greater than 180° in a plane perpendicular to the axis. A hand actuatable sleeve surrounds the generally cylindrical body, the first annular spring, and the second annular spring about the axis and engages the nut so that the sleeve rotationally drives the nut in the opening and closing directions and so that the sleeve is rotatable with respect to the nut over a limited arc between first and second relative rotational positions. The sleeve defines a cam surface that engages the first spring so that in the first relative rotational position between the sleeve and the nut, the first teeth and the at least one second tooth are disengaged and so that in the second relative rotational position between the sleeve and the nut, the first teeth and the at least one second tooth are engaged. The first teeth and the at least one second tooth are configured so that engagement of the first teeth and the at least one second tooth prevents relative rotation between the nut and the generally cylindrical body in the opening direction. The sleeve defines a notch that engages the second spring so that in the second relative rotational position between the sleeve and the nut. The notch receives the second distal end so that the notch resists relative rotational movement between the sleeve and the second spring in the opening direction.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
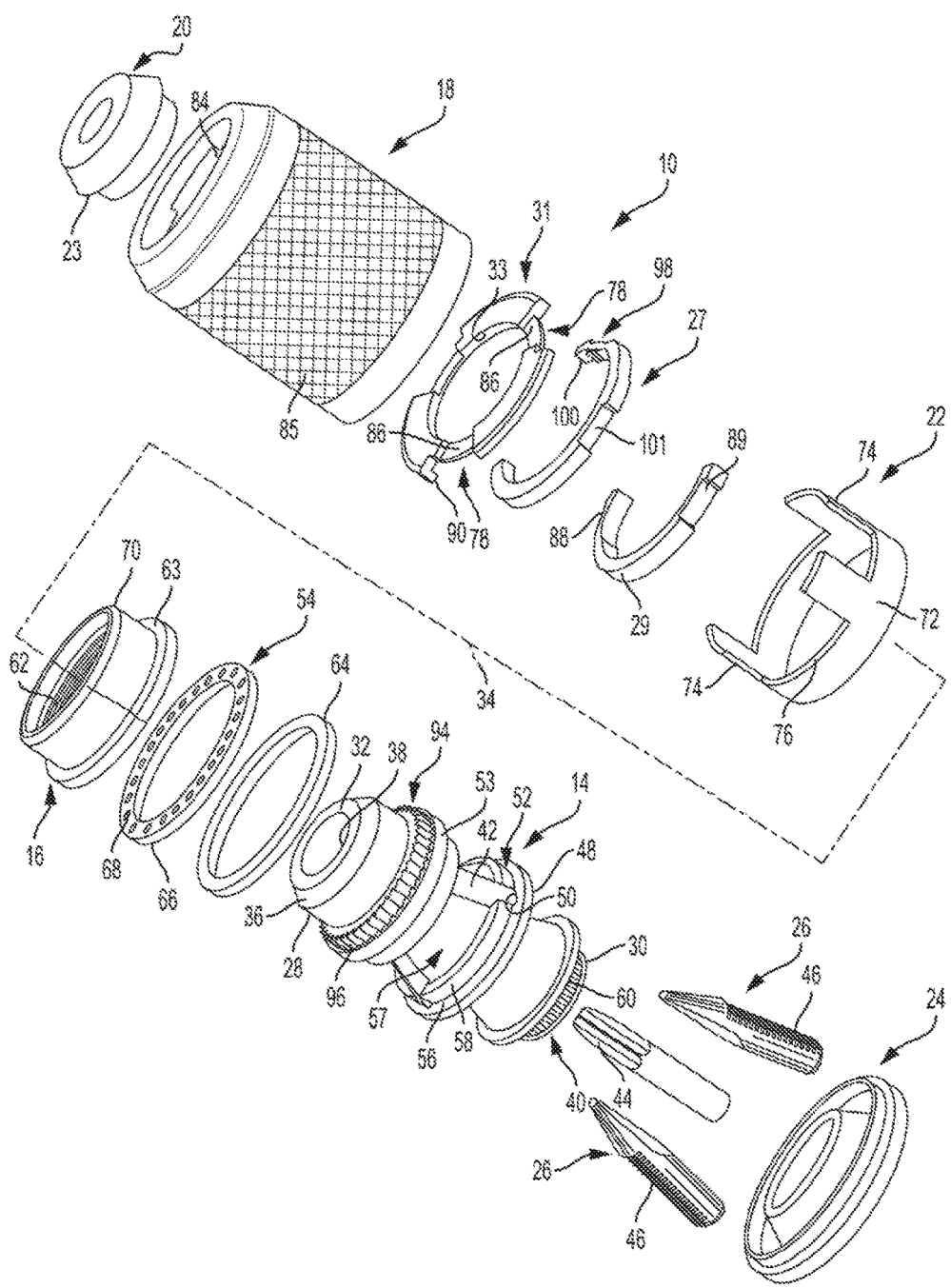
FIG. 1 is an exploded view of a chuck in accordance with an embodiment of the present disclosure.

Repeat use of reference characters in the present specification and drawings is intended to represent the same or analogous features or elements of the invention.

DETAILED DESCRIPTION

Reference will now be made in detail to embodiments of the disclosure, one or more examples of which are illustrated in the accompanying drawings. Each example is provided by way of explanation of the invention, not limitation of the invention. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. As used herein, "front" and "rear" are used to refer to those parts of the chuck that are disposed, with respect to a longitudinal center axis of the chuck, toward the end of the chuck that receives a shaft of a tool the chuck is intended to hold, and toward the end of the chuck that is connected to a driveshaft of a driver, respectively. Additionally, the terms "radial" or "radially" reference a direction in a plane that is transverse to the longitudinal center axis (in the rear-to-front direction) of the chuck.

Moreover, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 2:
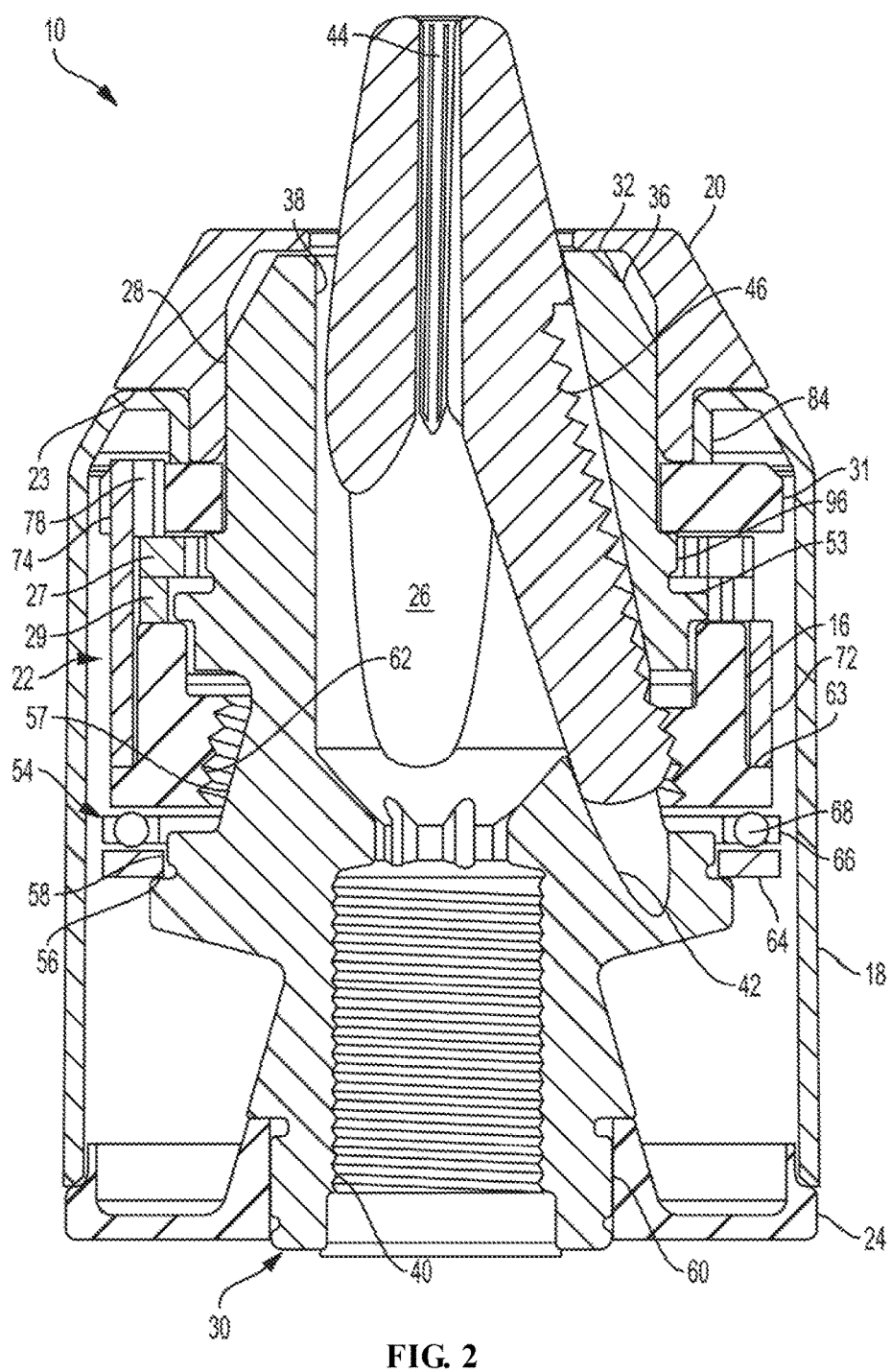
FIG. 2 is a longitudinal view, in cross section, of the chuck shown in FIG. 1.

Referring to FIGS. 1 and 2, an embodiment of a chuck 10 in accordance with the present disclosure includes a body 14, a nut 16, a front sleeve 18, a nose piece 20, a nut band 22, a rear cover disk 24, a plurality of jaws 26, a spring assembly comprising a chuck lock spring 27 and a sleeve lock spring 29, and a spring actuator 31. Body 14 is generally cylindrical in shape and comprises a nose or forward section 28 and a tail or rearward section 30. Nose section 28 has a front face 32 transverse to the longitudinal center axis 34 of body 14 and a tapered surface 36 at its forward end. The nose section defines an axial bore 38 that is dimensioned somewhat larger than the largest tool shank that the chuck is designed to accommodate. A threaded bore 40 is formed in tail section 30 and is of a standard size to mate with a driveshaft of a powered or hand driver (not shown). Axial bore 38 and the threaded bore may communicate at a central region of body 14 by way of a socket as shown in FIG. 2 and described in U.S. Pat. No. 5,193,824, the entire disclosure of which is incorporated by reference herein, to facilitate mounting chuck 10 on the corresponding driveshaft. While a threaded rear bore is described herein, such bore could be replaced with a tapered bore of a standard size to mate with a tapered driveshaft. Furthermore, body 14 may be formed integrally with the driveshaft.

Body 14 defines three passageways 42 to accommodate the three jaws 26. Each jaw is separated from each adjacent jaw by an arc of approximately 120°. The coincident axes of passageways 42 and jaws 26 are angled with respect to the chuck center axis 34 such that each passageway axis travels through axial bore 38 and intersects axis 34 at a common point ahead of the chuck body. The jaws forms a grip that moves radially toward and away from the chuck axis to grip and release a tool, and each jaw 26 has a tool engaging face 44 generally parallel to chuck body axis. Threads 46, formed on each jaw's opposite or outer surface, may be constructed in any suitable type and pitch, and in certain embodiments described herein in a type and pitch to achieve a desired grip torque in response to a predetermined sleeve tightening torque.

As illustrated in FIGS. 1 and 2, body 14 includes a thrust ring 48 that, in one or more embodiments, may be integral with the main portion of the body. It should be understood, however, that thrust ring 48 and the main portion of body 14 may be separate components. Thrust ring 48 includes a plurality of guideways 50 formed around its circumference to permit retraction of jaws 26 therethrough and also includes a rearward ledge 52 to receive a bearing 54 and bearing washer 64. Rearward ledge 52 includes a first surface 56 and a second surface 58. First surface 56 extends radially outwardly away from, and in a plane perpendicular to, chuck body longitudinal center axis 34. Second surface 58 is generally cylindrical and extends axially along, and is concentric about, chuck body longitudinal center axis 34. A front ledge 53 extends radially outwardly from the body forward of thrust ring 48. Forward axial motion of nut 16, which is received in an annular groove 57 formed in chuck body 14 between front ledge 53 and thrust ring 48, relative to body 14 is prevented by front ledge 53.

Body tail section 30 includes a knurled surface 60 that receives rear cover disk 24, or an optional rear sleeve (not shown), in a press fit. The rear cover disk 24 could also be retained by press fit without knurling, by use of a key or by crimping, staking, riveting, threading or any other suitable securing mechanism. In the presently described embodiments, the chuck is constructed with a single hand-grippable front sleeve 18 with rear cover disk 24, but it should be understood that two-sleeve (rear and front sleeve) embodiments are also encompassed by the present disclosure.

Nut 16, which in the described embodiment is a split nut, defines female threads 62 located on an inner circumference of the nut and is received in annular groove 57 by separate placement of the two nut halves in the groove, as should be understood in this art. A bearing washer 64 is received adjacent first surface 56 of ledge 52 between thrust ring 48 and bearing 54. Bearing 54 includes a bearing cage 66 that holds a plurality of balls 68 that permit nut 16 to rotate relative to the chuck body. Bearing 54 is disposed between the front surface of bearing washer 64 and the rear surface of nut 16. Nut 16 is shown in FIG. 1 without serrations or knurling on its outer circumference. However, it should be understood that nut 16 may be formed with axially-aligned teeth, or other forms of knurling, on its outer circumference, and its front outer edge is preferably provided with a small chamfer 70 to facilitate the press-fitting of nut 16 into nut band 22. Nut 16 may include a ledge 63 extending radially outwardly from its rear end for abutting the rearward edge of nut band 22 when nut band 22 is press-fitted onto nut 16 so that nut 16 is fully inserted into nut band 22.

Nut band 22 includes an annular band 72 that surrounds nut 16 in a press-fit. A plurality of nut drive dogs 74 extend forwardly from a forward edge 76 of annular band 72 and are received in a corresponding plurality of nut drive recesses 78 that are defined in the outer perimeter of spring actuator 31 (FIGS. 3A-3E). Each nut drive dog 74 is limitedly rotatable in its corresponding nut drive recess 78 through a predetermined angle about axis 34 dependent on the difference in angular widths between dogs 74 and recesses 78, as discussed in greater detail below. In this embodiment, three nut drive dogs 74 and three nut drive recesses 78 are provided.

Figure 3:
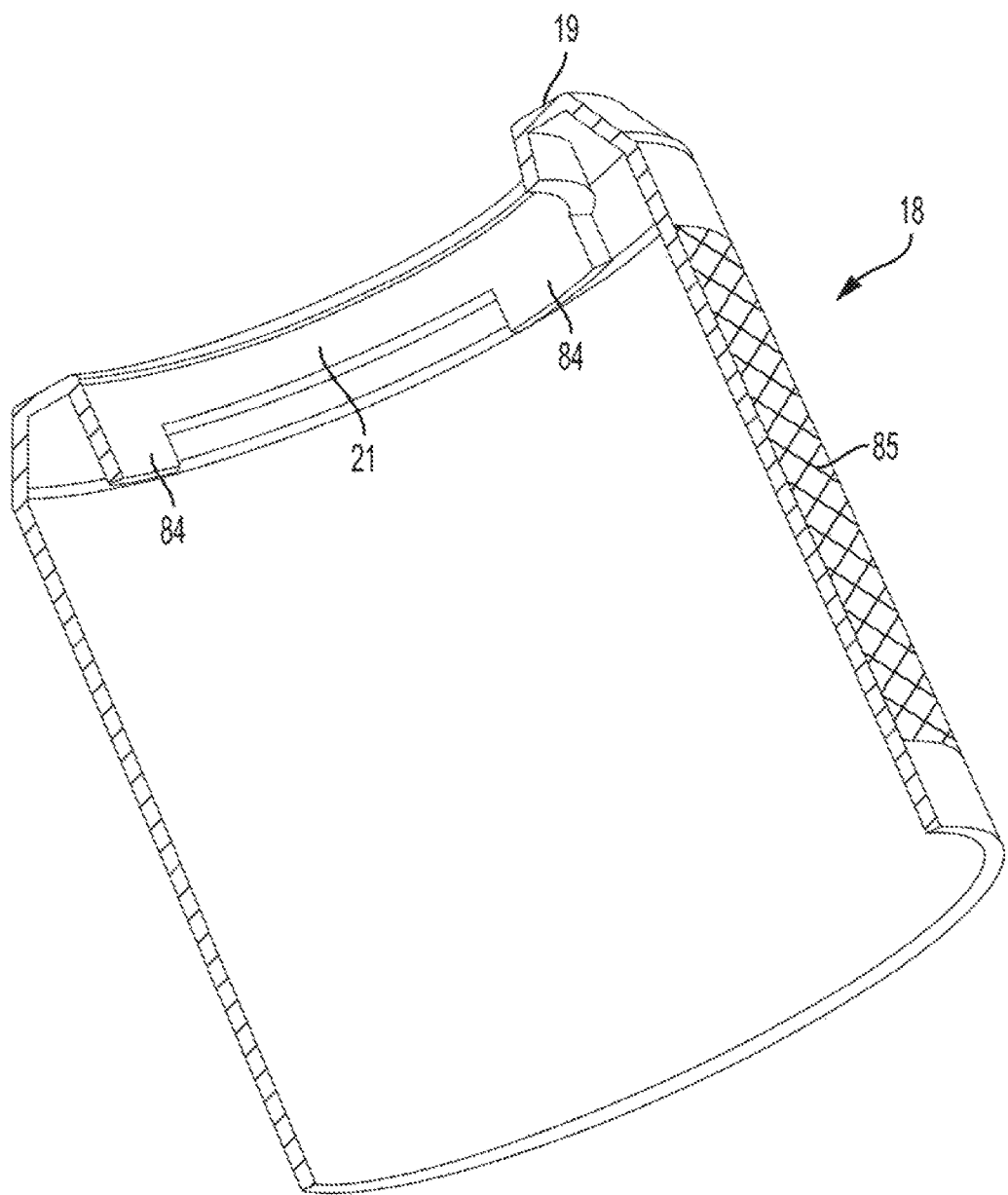
FIG. 3 is a cross-sectional view of the sleeve of the chuck shown in FIG. 1.
Figure 4A:
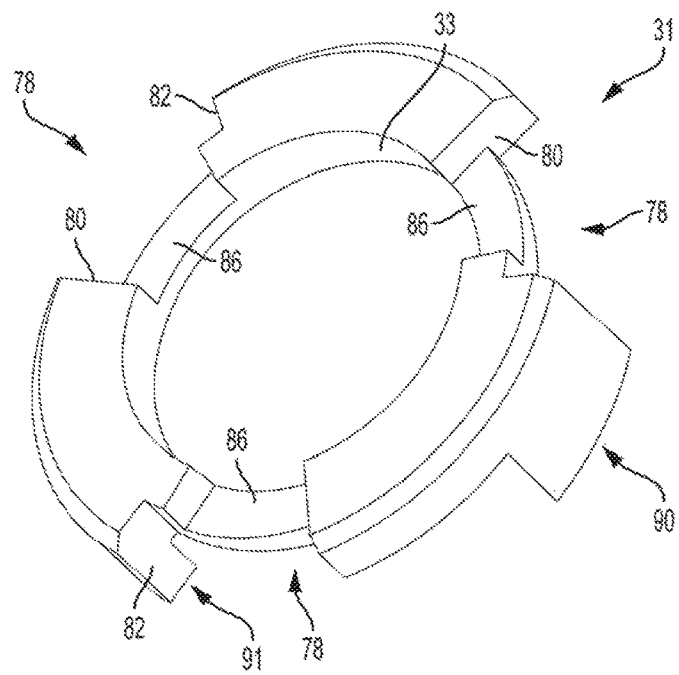
FIGS. 4A through 4E are perspective front, perspective rear, front, rear and side views, respectively, of the pawl actuator of the chuck as shown in FIG. 1.
Figure 4B:
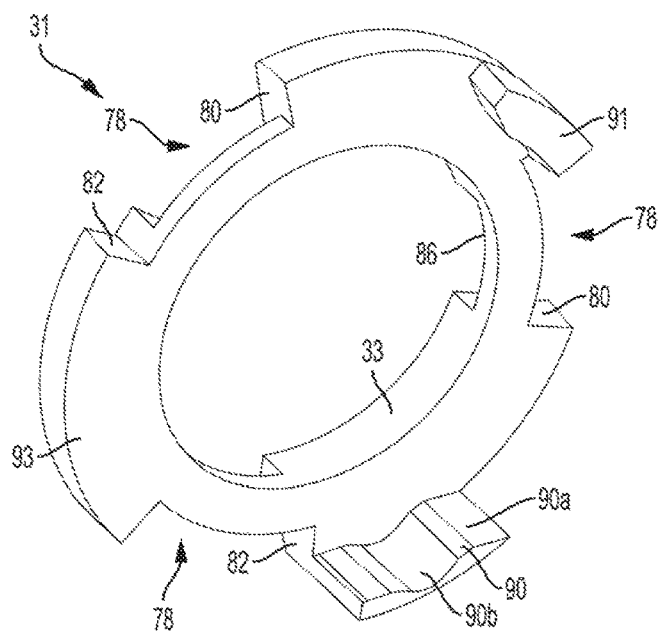
Figure 4C:
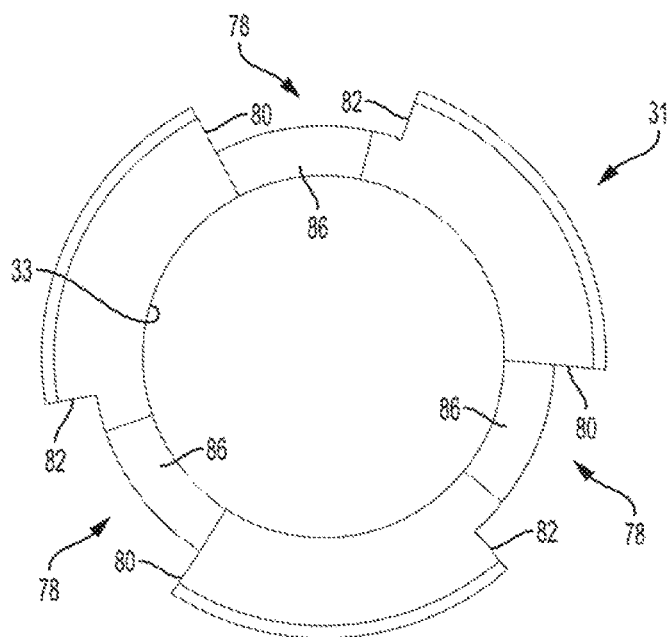
Figure 4D:
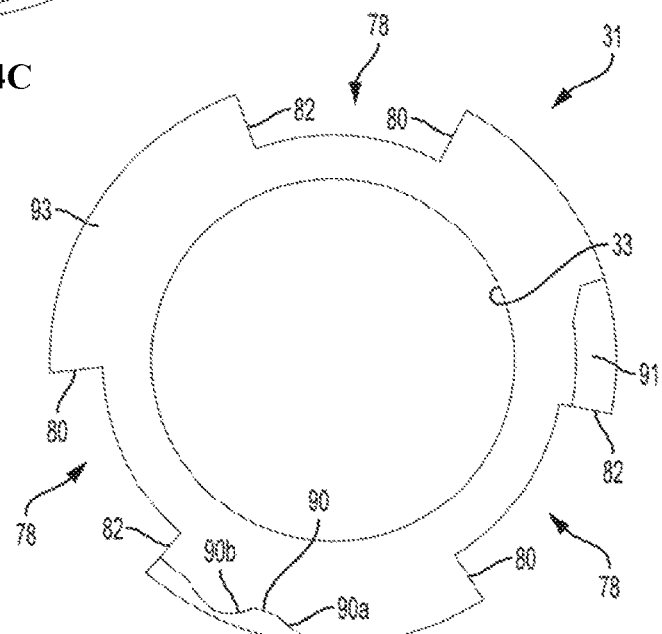
Figure 4E:
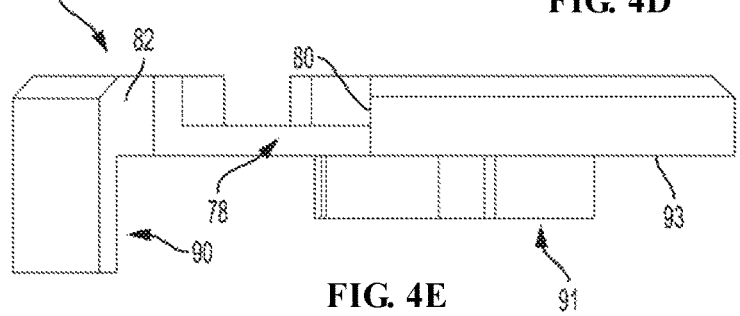

Referring additionally to FIG. 3, front sleeve 18 is substantially cylindrical in shape and terminates at its front end with an annular front face 19 that is generally planar in a plane perpendicular to longitudinal center axis 34 of chuck body 14. An inner flange 21 extends rearwardly from the innermost perimeter of front face 19 and includes a plurality of drive dogs 84 extending rearwardly from its rear edge, in a direction parallel to axis 34. In the presently described embodiments, front sleeve 18 includes three drive dogs 84. Front sleeve 18 is rotatably disposed about body 14 and axially retained thereon by nose piece 20, which is in turn pressed onto body forward section 28. A radially outwardly depending lip 23 of nose piece 20 extends radially (with respect to axis 34) beyond the innermost perimeter of front face 19 of the sleeve. Each drive dog 84 of front sleeve 18 is received in a respective drive recess 86 (as seen in FIGS. 4A through 4E) defined by spring actuator 31 so that the distal ends of dogs 84 abut the bottoms of the respective drive recesses 86. The angular widths of drive dogs 84 and recesses 86 are the same (though allowing for a sliding fit of dogs 84 into recesses 86), so that spring actuator 31 is rotationally fixed to front sleeve 18. Each sleeve drive recess 86 extends circumferentially about the inner perimeter of spring actuator 31.

As shown, the outer circumferential surface of front sleeve 18 may be knurled or may be provided with longitudinal ribs or other protrusions to enable the operator to grip the sleeve securely. In like manner, the circumferential surface of rear disk cover 24 or a rear sleeve, if employed, may be knurled or ribbed if desired. Front sleeve 18 and rear cover disk 24 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck of the present disclosure is fabricated will depend on the end use of the chuck, and the above materials are provided by way of example only.

Referring now to FIGS. 4A through 4E, spring actuator 31 is substantially annular in shape, defining a central bore 33 that is configured to be, and is, rotatably received about forward section 28 of the chuck body. In this embodiment, spring actuator 31 defines three nut drive recesses 78 extending circumferentially about its outer perimeter. Each nut drive recess 78 is configured to receive, and receives, a respective nut drive dog 74 of nut band 22. Additionally, spring actuator 31 defines a plurality of sleeve drive recesses 86, as described above, each sleeve drive recess 86 depending inwardly into the front face of spring actuator 31 and being in communication with a perimeter of its central bore 33 adjacent its innermost perimeter. Spring actuator 31 also includes a sleeve lock projection 90 and a locking cam 91 that depend axially rearwardly from the spring actuator's rear race 93. Sleeve lock projection 90 extends radially inwardly toward longitudinal center axis 34 of the chuck's body and cooperates with a sleeve lock pawl 88 at a distal end of sleeve lock spring 29 (FIGS. 6A and 6B) to maintain front sleeve 18 in a selected rotational position with respect to the nut and a chuck lock spring 27, as discussed in greater detail below. Similarly, locking cam 91 also extends radially inwardly toward longitudinal center axis 34 of front sleeve and is selectively engagable with a lock pawl 98 of chuck lock spring 27 (FIGS. 5A and 5B) to transition chuck 10 between the locked and un-locked states, as discussed in greater detail below. Spring actuator 31 may be formed from a metal such as, but not limited to, spring steel.

Figure 5A:
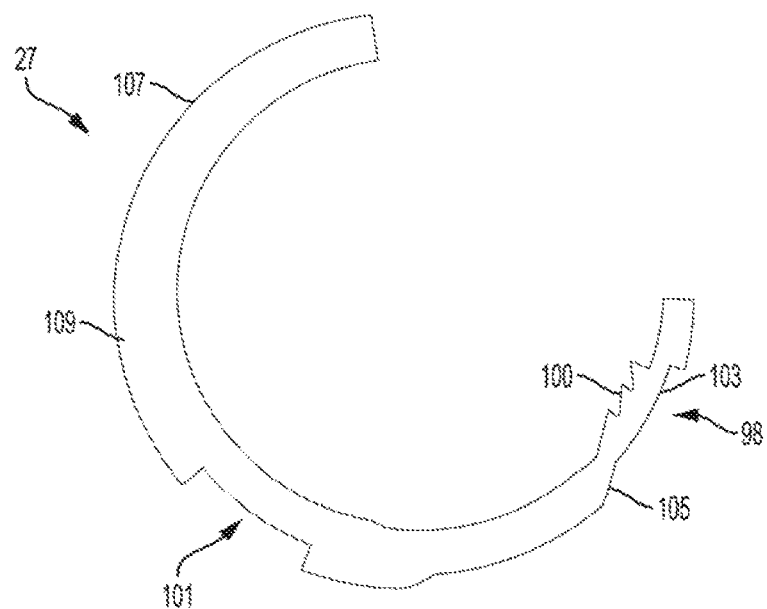
FIGS. 5A and 5B are a front view and a rear perspective view of the chuck lock spring of the chuck as shown in FIG. 1.
Figure 5B:
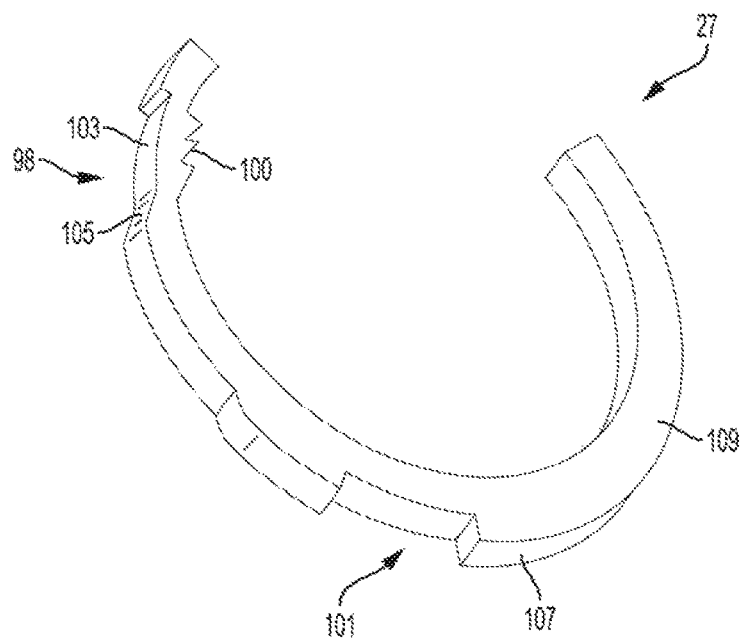
Figure 7A:
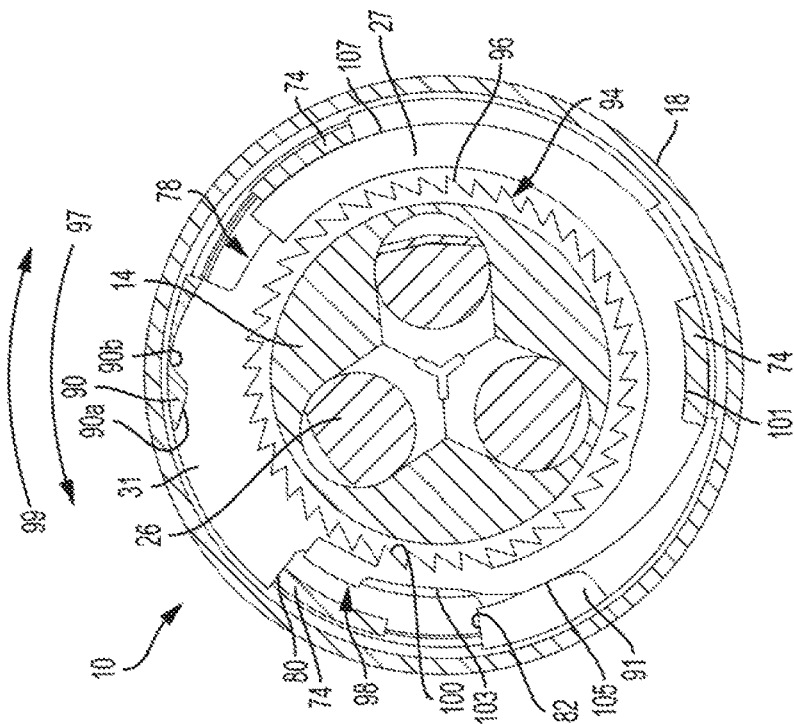
FIGS. 7A and 7B are cross-sectional views of the chuck as shown in FIG. 1, taken to the rear of the chuck lock spring, in the unlocked and locked positions, respectively.
Figure 7B:
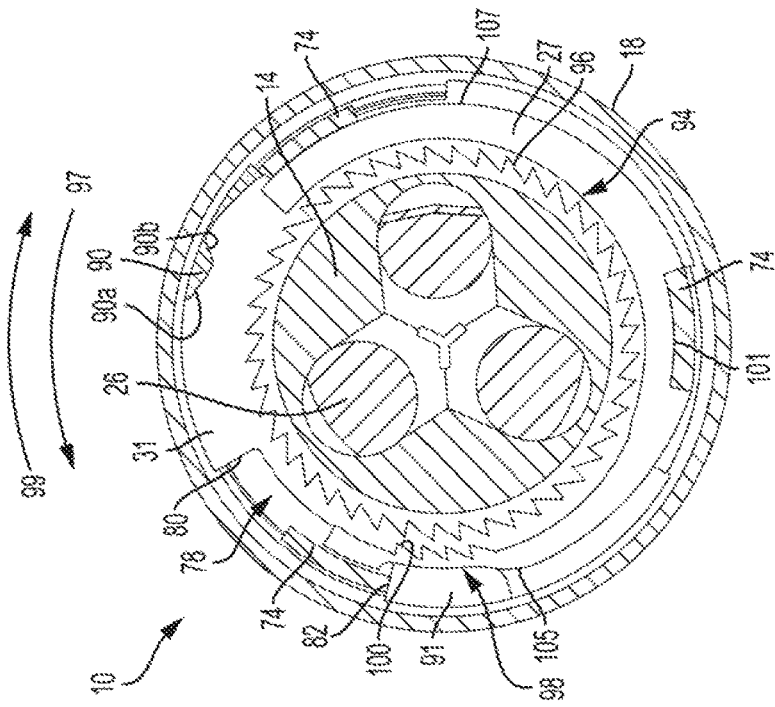
Figure 10:
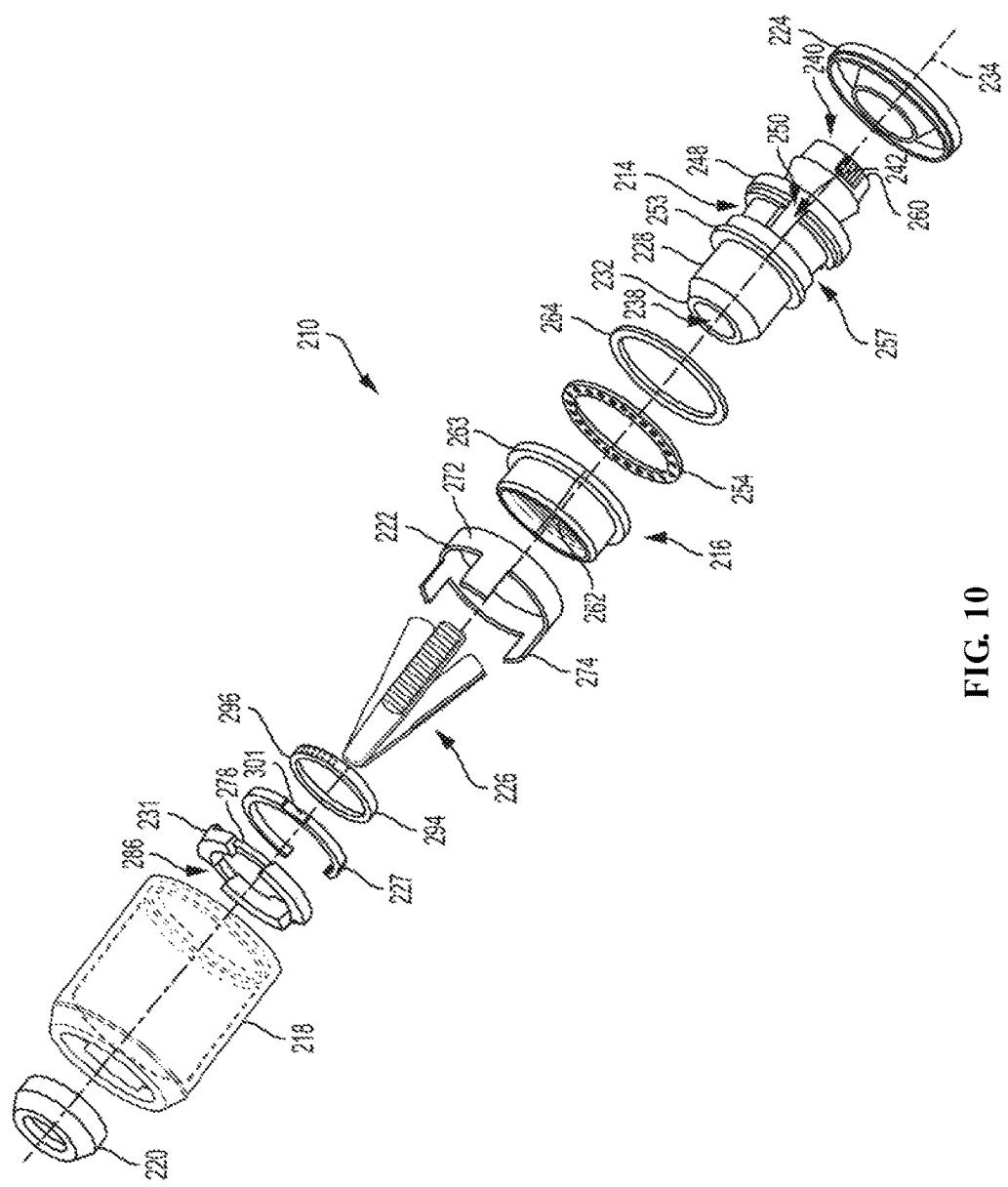
FIG. 10 is an exploded view of a chuck in accordance with an embodiment of the present invention.
Figure 11:
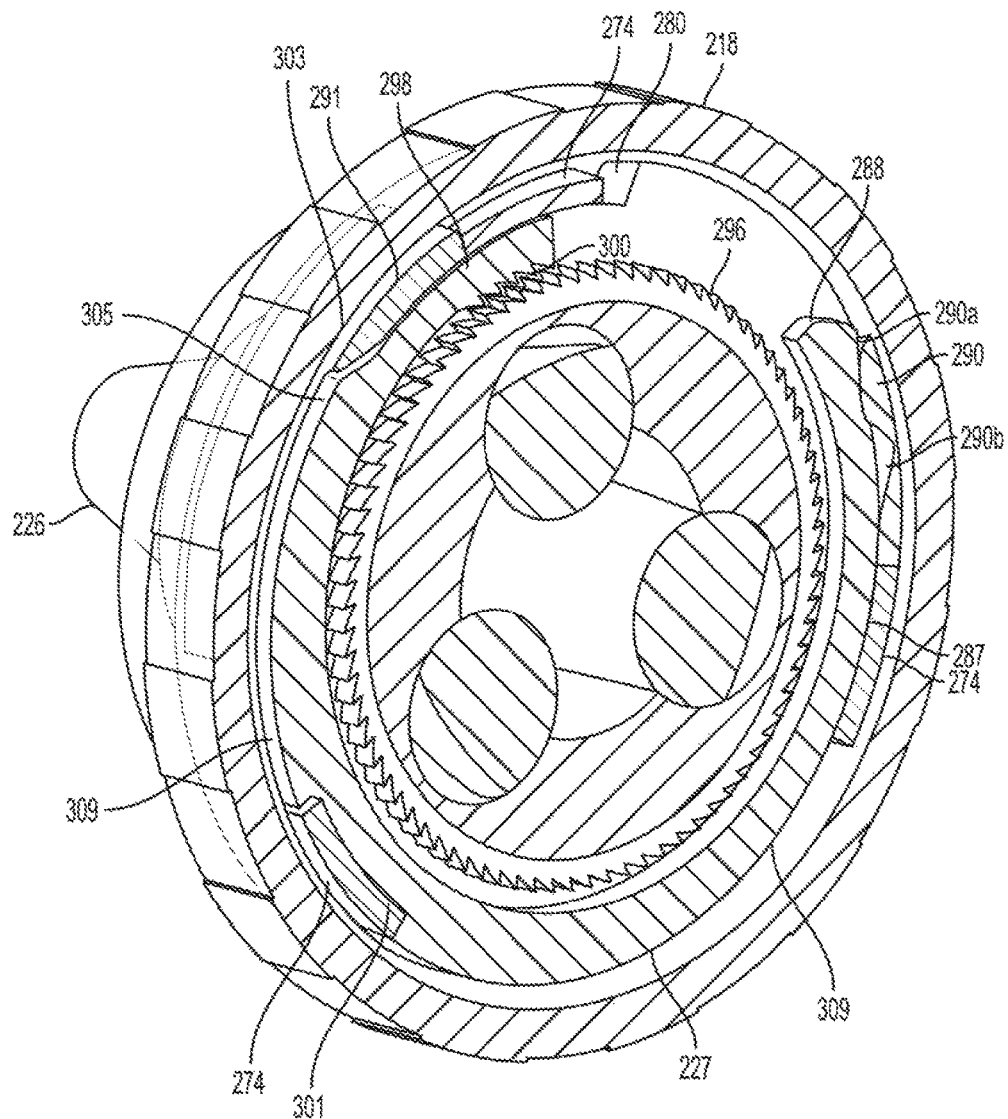
FIG. 11 is a partial section view, in perspective, of the chuck shown in FIG. 10.
Figure 12:
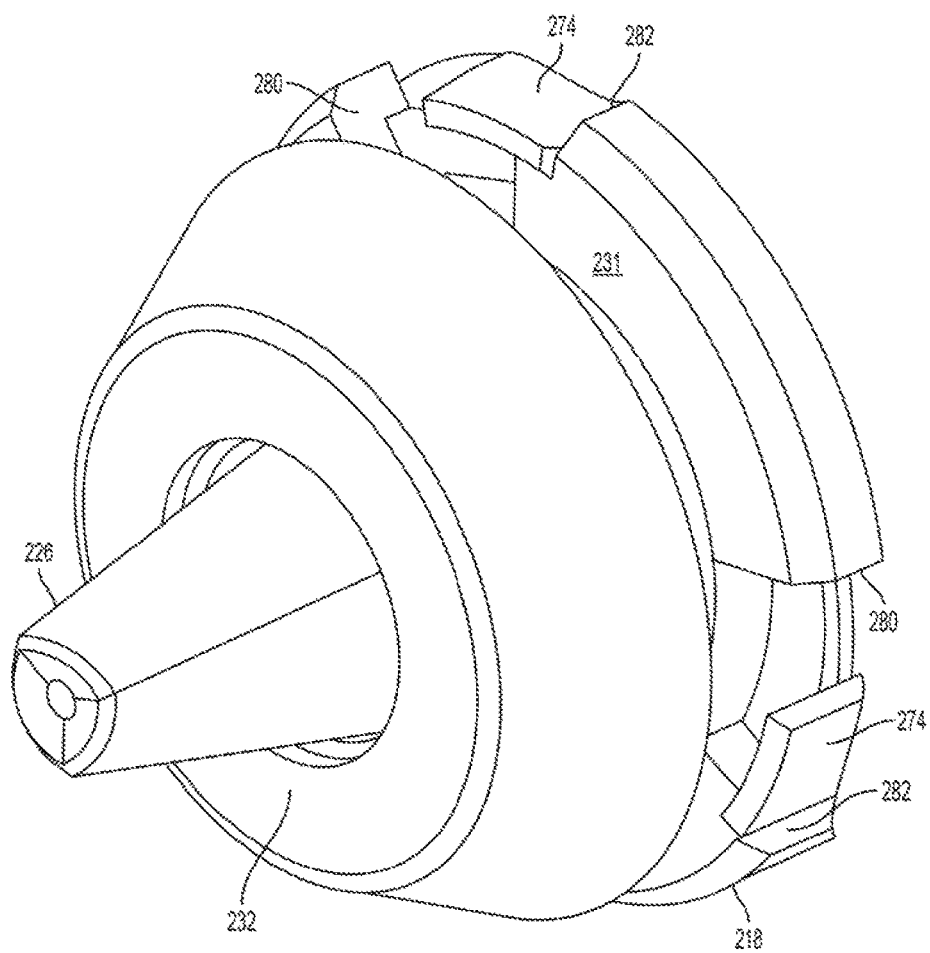
FIG. 12 is a partial section view, in perspective, of the chuck shown in FIG. 10.

Referring now to FIGS. 5A and 5B, chuck lock spring 27 is substantially C-shaped and includes a body portion 109 that is thicker in the radial direction (with respect to the chuck body axis) than a deflectable chuck lock pawl 98 extending circumferentially from a first end of body portion 109. As should be understood in view of the present disclosure, spring 27 will repeatedly flex in the radial direction in and out of an engagement by locking teeth 100 with ratchet teeth 96. Body portion 109 flexes slightly in the chuck's operation as described herein, and spring 27 has a long length, extending in the presently described embodiment more than half about the chuck body, or defining an angular width of more than 180° with respect to the chuck axis in a plane perpendicular to the chuck axis. Body portion 109 of chuck lock spring 27 includes a mounting recess 101 that depends radially inwardly (toward axis 34, considered in the assembled chuck) from the spring's outer surface 107 and that has an angular width sufficient to allow recess 101 to slidably receive a respective nut drive dog 74 of nut band 22 therein but otherwise approximately equaling the angular width of dog 74, thereby rotationally fixing chuck lock spring 27 to nut band 22 as seen in FIGS. 7A and 7B. Because nut band 22 is pressed to nut 16, chuck lock spring 27 is therefore rotationally fixed to nut 16. As shown, second ends of body portion 109 and chuck lock pawl 98 are each disposed radially inwardly of respective ones of nut drive dogs 74. Note, however, in alternate embodiments a second mounting recess 101 and 89 may be provided in each of chuck lock spring 27 and sleeve lock spring 29, respectively, for receiving a second one of the nut drive dogs 74 of nut band 22. In this embodiment, chuck lock pawl 98 is thinner in the radial direction (with respect to axis 34 in the assembled chuck) than is body portion 109, thereby accommodating lock cam 91 of spring actuator 31 to cam chuck lock pawl 98 radially inwardly, as discussed in greater detail below. The spring body in this example is configured to provide sufficient stiffness to resist the chuck's opening when teeth 100 engage teeth 96 and also to resist fatigue over repeated operation as discussed herein. In this example, the maximum widths (i.e. not where notches occur) of body 109 in the radial direction (with respect to the chuck axis) ranges between about 0.126 inches (about 3.2 mm) and about 0.128" (about 3.3 mm), and pawl portion 98 has a width (not considering teeth 100) of about 0.115 inches (about 2.9 mm). The spring has a width in the axial direction (with respect to the chuck axis) of about 0.094" (about 2.4 mm). Of course, it will be understood that the spring dimensions can vary as desired to achieve desired operating characteristics for a given chuck configuration, and for instance in this example the radial and axial dimensions are chosen together to provide strength and fatigue characteristics and, as discussed below with respect to the embodiment of FIGS. 10-12, are also chosen or determined in view of the chuck's configuration to achieve a desired chuck opening torque level (e.g. at or about thirty inch-pounds). Thus, the dimensional examples provided herein should not be considered as limitations on the present disclosure.

Chuck lock pawl 98 includes a plurality of locking teeth 100 depending radially inwardly therefrom that are selectively engagable with ratchet teeth 96 of annular ratchet 94 that is formed on the chuck's body 14 forward of front ledge 53. Three teeth 100 are provided, to increase the spring's ability to hold the rotational lock, as described herein, with teeth 96. While three teeth are illustrated, other numbers of teeth may be used in other embodiments. Chuck lock spring 27 is preferably formed from a metal such as, but not limited to, spring steel. It will be understood from the present disclosure that other materials, for example but not limited to beryllium bronze, could be used to form the springs discussed herein.

Figure 6A:
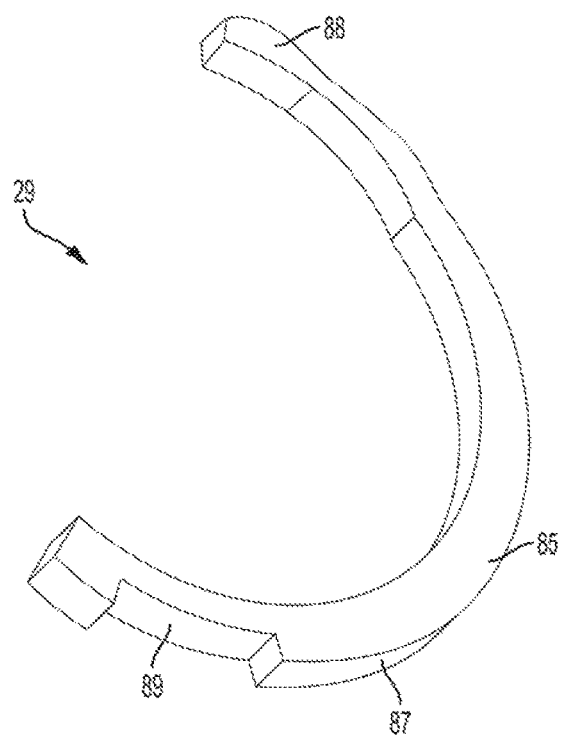
FIGS. 6A and 6B are a front view and a rear perspective view of the sleeve lock spring of the chuck as shown in FIG. 1.
Figure 6B:
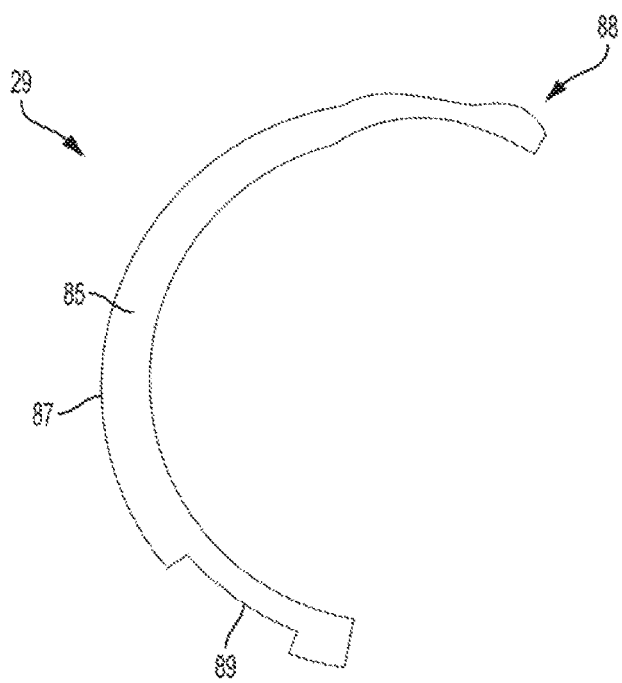
Figure 8B:
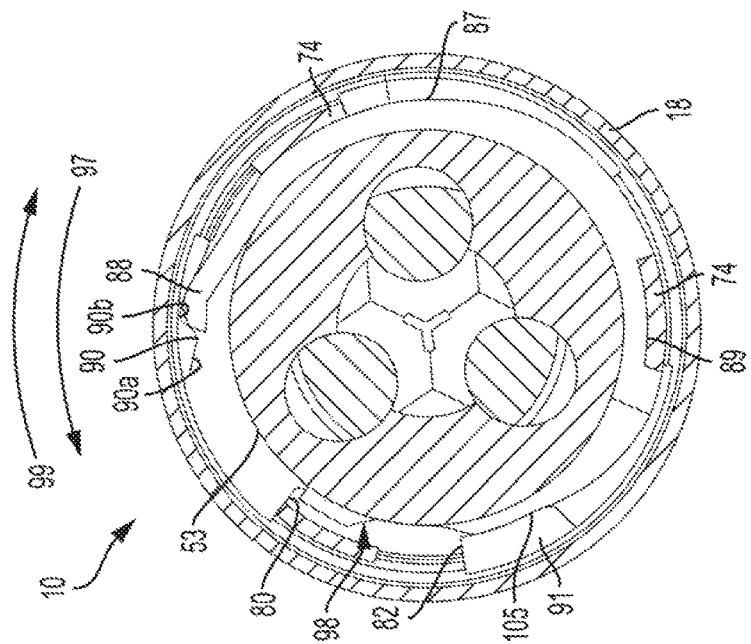
FIGS. 8A and 8B are cross-sectional views of the chuck as shown in FIG. 1, taken to the rear of the sleeve lock spring, in the unlocked and locked positions, respectively.
Figure 8A:
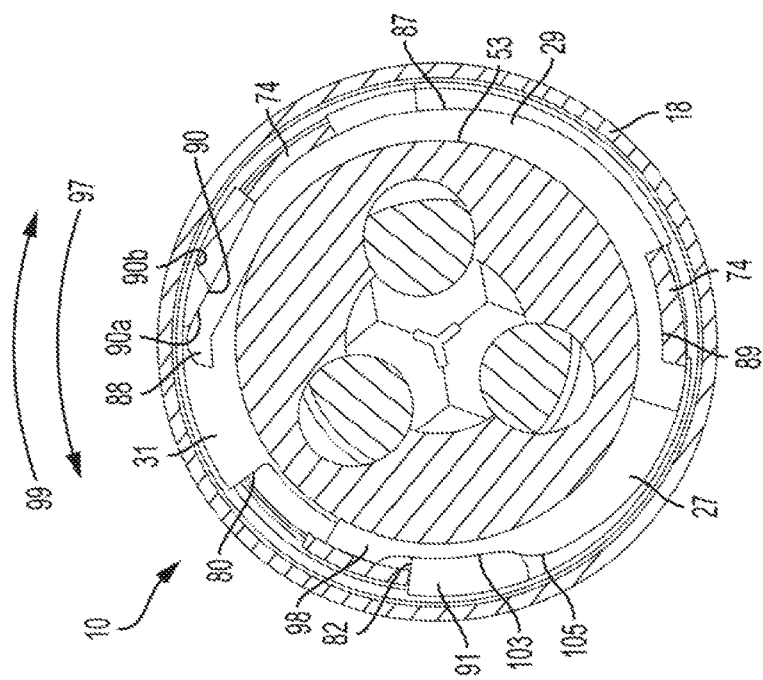

Referring now to FIGS. 6A and 6B, sleeve lock spring 29 is substantially C-shaped and includes a body portion 85 that rides on chuck body ledge 53 behind (in the perspective of the chuck body as described herein) spring 27 and a sleeve lock pawl 88 extending circumferentially from one end thereof. Body portion 85 of sleeve lock spring 29 includes a mounting recess 89 that depends radially inwardly (toward axis 34, considered in the assembled chuck) from its outer surface 87 on the end opposite sleeve lock pawl 88 and that has an angular width sufficient to allow recess 89 to slidably receive a respective nut drive dog 74 of nut band 22 therein but otherwise approximately equal the angular width of dog 74, thereby rotationally fixing sleeve lock spring 29 to nut band 22 as seen in FIGS. 8A and 8B. Because nut band 22 is pressed onto nut 16, sleeve lock spring 29 is rotationally fixed to nut 16. Additionally, outer surface 87 of sleeve lock spring 29 abuts an inner surface of a second one of the nut drive dogs 74 adjacent the base of sleeve lock pawl 88. In the illustrated embodiments, sleeve lock pawl 88 is thinner in the radial direction than is body portion 85, thereby accommodating sleeve lock projection 90 of spring actuator 31 to cam sleeve lock pawl 88 radially inwardly by the sleeve lock projection's first and second camming surfaces 90a and 90b. Sleeve lock spring 29 is preferably formed from a metal such as, but not limited to, spring steel, although other materials may be used, as described above with regard to spring 27. The dimensions of spring 29 are chosen to provide a desired hold lock or chuck opening torque level, as indicated herein and discussed with respect to the embodiment of FIGS. 10-12, and can be generally similar to those of spring 27.

As noted, nut drive dogs 74 of nut band 22 are received in respective nut drive recesses 78, as seen in FIGS. 7A and 7B, defined by spring actuator 31. Each nut drive recess 78 extends circumferentially about the outer perimeter of spring actuator 31. The angular width of each nut drive dog 74 is less than that of its corresponding nut drive recess 78, resulting in a limited range of allowed relative rotational movement between sleeve 18, to which spring actuator 31 is rotationally fixed as described above, and nut 16. Thus, front sleeve 18 and, therefore, spring actuator 31 are also rotatable through the same limited range with respect to chuck lock spring 27 and sleeve lock spring 29, as discussed in greater detail below. For example, front sleeve 18 is rotatable in this example with respect to nut 16, between about 16° and about 20°. Each nut drive recess 78 has a pair of opposed sidewalls 80 and 82 adapted to be selectively abutted by respective nut drive dogs 74 to thereby define the range of the limited allowed relative rotational movement.

Due to the approximately equal angular widths of drive dogs 84 of front sleeve 18 and drive recesses 86 of spring actuator 31, the application of torque to front sleeve 18 about chuck axis 34 applies same-direction torque to spring actuator 31. As also described below, front sleeve 18 transfers torque to nut 16 through engagement of sleeve lock pawl 88 and chuck lock pawl 98 with sleeve lock projection 90 and locking cam 91 of spring actuator 31, respectively, (in certain instances, the front sleeve transfers torque directly to the nut via nut band 22). Accordingly, rotational torque applied to front sleeve 18 is transferred either through such engagement to nut band 22 and, therefore, nut 16 via the press fit between nut band 22 and nut 16, or through the engagement of nut drive dogs 74 with the side walls 80 and 82 of nut drive recesses 78. Thus, rotation of front sleeve 18 in the opening or closing direction of the chuck about axis 34 also rotates nut 16 in the same opening or closing direction. Due to the thread direction of threads 62, rotation of nut 16 in a first, or closing, rotational direction 97 (see FIGS. 8A through 9B) about axis 34 causes jaws 26 to move radially inward toward axis 34, while rotation of nut 16 in a second, or opening, rotational direction 99 about axis 34 causes jaws 26 to move radially away from axis 34 in respective passageways 42.

As noted above, a ratchet in the form of an annular ratchet 94 is formed on body 14 forward of front ledge 53. In alternate embodiments, the annular ratchet ring may be formed as a separate component that is then press-fit onto the body of the chuck so that its rear face abuts the front face of the chuck body's front ledge 53. In the illustrated embodiment, the ratchet is formed by a plurality of sawtooth-shaped ratchet teeth 96 disposed about an outer circumferential surface of the chuck's body. Chuck lock spring 27 is rotationally fixed to nut band 22 and is biased radially outward from annular ratchet 94, thereby urging a distal end, or lock pawl 98, of chuck lock spring 27 away from the annular array of teeth 96 on the annular ratchet.

As seen in FIGS. 7A and 7B, each ratchet tooth 96 has a radially-outwardly extending first side that lies substantially in a plane in which longitudinal center axis 34 of the chuck body lies. The second side of each tooth 96 forms an acute internal angle with the first side, thereby having a lesser slope than the first side. Lock pawl 98 is deflectable in this embodiment and includes a plurality of locking teeth 100, although in other embodiment a single tooth is provided. Similar to ratchet teeth 96, each locking tooth 100 has a first side that lies substantially in a plane in which longitudinal center axis 34 of the chuck body lies, and a second side with a lesser slope than the first side. The second side if each locking teeth 100 is generally disposed in alignment with the sloped of the second side of the ratchet teeth. Thus, upon rotation of front sleeve 18 in first direction 97 (the closing direction) with respect to the chuck body 14, once lock pawl 98 has moved to the locked position (FIGS. 7B and 9B), as discussed in greater detail below, outer race 78 moves locking teeth 100 repeatedly over ratchet teeth 96, causing a clicking sound as they fall against each subsequent second side of each ratchet tooth 96. This configuration of ratchet teeth 96 and locking teeth 100, however, prevents the rotation of nut 16 in the opposite second direction 99 (the opening direction) once jaw faces 44 have engaged a tool shank (not shown) and front sleeve 18 urges lock pawl 98 into the locked position. Application of rotational force to the nut in the opening direction 99 forces the steep-sloped first side of locking teeth 100 into the steep-sloped first sides of ratchet teeth 96. Since the first sides of locking teeth 100 are generally perpendicular to the first sides of ratchet teeth 96, the locking teeth 100 of locked pawl 98 do not deflect to permit rotation. Accordingly, when locking teeth 100 engage ratchet teeth 96, the teeth permit movement of front sleeve 18 and, therefore, nut 16 in closing direction 97 of the chuck but prevent movement of nut 16 in opening direction 99.

Figure 9B:
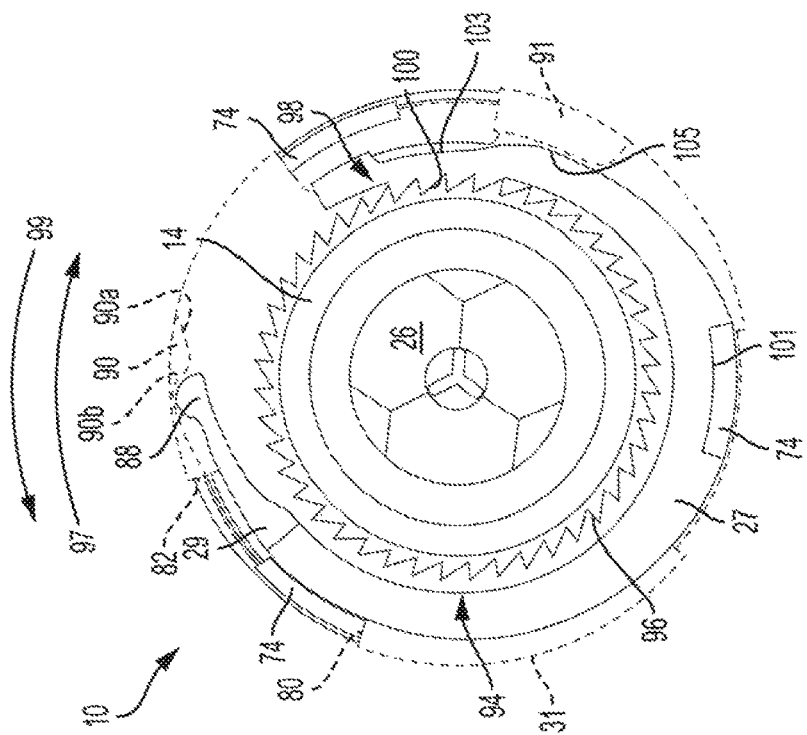
FIGS. 9A and 9B are front views of the chuck as shown in FIG. 1, with the outer sleeve and sleeve retainer removed, in the unlocked and locked positions.
Figure 9A:
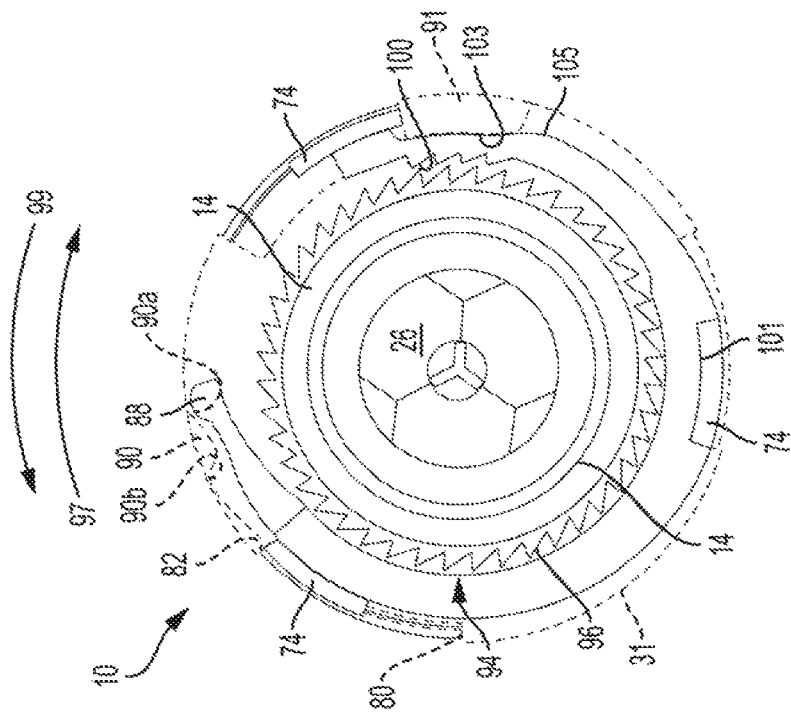

FIGS. 7A, 8A and 9A illustrate the disposition of chuck lock pawl 98 and sleeve lock pawl 88 when front sleeve 18 is in a first of two positions (the unlocked position) with respect to nut 16, while FIGS. 7B, 8B and 9B illustrate these components when front sleeve 18 is in a second position (the locked position) with respect to nut 16. FIGS. 7A, 7B, 8A and 8B are rear cross-sectional views of the chuck, whereas FIGS. 9A and 9B are front views of the chuck, with the front sleeve omitted for ease of illustration. Referring to FIGS. 7B, 8B and 9B, each nut drive dog 74 is disposed against or adjacent to side wall 80 of the respective nut drive recess 78 in which is it received when front sleeve 18 is in the second (locked) position with respect to the nut. Lock cam 91 of spring actuator 31 is received on cam surface 105, which is adjacent recess 103 of lock pawl 98, and sleeve lock pawl 88 of sleeve lock spring 29 is positioned adjacent a second camming surface 90b of sleeve lock projection 90. Accordingly, locking teeth 100 of lock pawl 98 are forced inwardly and engage ratchet teeth 96. Sleeve lock spring 27 and, therefore, nut 16 can therefore rotate only in closing direction 97 with respect to the chuck body. As noted herein, teeth 96 and 100 are configured so that when engaged as shown in FIGS. 7B and 9B, the teeth prevent the nut's rotation in opening direction 99 with respect to the chuck body but allow the nut's rotation in closing direction 97, provided sufficient torque is applied to the nut (e.g. by application of hand delivered torque to the sleeve) to cause teeth 96 and 100 to ride over each other. It will also be noted that camming surface 90b forms a depression or notch, in the radial direction, in sleeve lock projection 90. Since distal end/pawl 88 is received in this notch, and is biased radially outward into the notch by the spring body, the force of that bias, in combination with the geometry of notch 90*b* and pawl 88, holds the sleeve in the rotational position with respect to the nut and the body shown in FIGS. 7B, 8B, and 9B, preventing its inadvertent rotation in opening direction 99 with respect to the nut and the body, which could otherwise cause the sleeve to move to the position relative to the nut and body shown in FIGS. 7A, 8A, and 9A, which would in turn release the engagement of teeth 96 and 100 and possibly allow the nut to move in opening direction 99 with respect to the chuck body. Thus, the engagement of pawl 88 and notch 90*b* resist movement of the sleeve and nut in the opening direction.

Referring now to FIGS. 7A, 8A and 9A, when the user grips front sleeve 18 and applies a predetermined torque (e.g. at least about, and in certain embodiments at least, thirty inch-pounds in presently described examples) to the sleeve in opening direction 99, sleeve 18 moves in opening direction 99 with respect to the chuck body from the locked position shown in FIGS. 7B, 8B, and 9B, and sleeve lock pawl 88 passes over sleeve lock projection 90 from second camming surface 90*b* until it is adjacent first camming surface 90*a*. As well, lock cam 91 rides off of cam surface 105 and into recess 103 of chuck lock pawl 98. With the springs in these positions, the chuck is in the unlocked condition shown in FIGS. 7A, 8A, and 9A. This allows the spring to return chuck lock pawl 98 to its normal, outwardly biased position, thereby disengaging its locking teeth 100 from ratchet teeth 96 of annular ratchet 94. Thus, chuck lock spring 27 and, therefore, nut 16 are free to rotate with respect to chuck body 14. Continued rotation of front sleeve 18 in opening direction 99 causes the rotation of nut 16 in the opening direction, thereby causing jaws 26 to move rearwardly within their respective passageways 42 of chuck body 14.

As described in more detail below, when front sleeve 18, and therefore spring actuator 31, rotate with respect to the chuck body and nut 16 in opening direction 99 so that lock cam 91 and sleeve lock pawl 88 move from the positions shown in FIGS. 7B, 8B and 9B to the positions shown in FIGS. 7A, 8A and 9A, nut drive recesses 78 of spring actuator 31 move with respect to nut drive dogs 74 so that each nut drive dog 74 is against or immediately adjacent to side wall 82 of the respective nut drive recess 78.

In operation, nut drive recesses 78 receive nut drive dogs 74 when the chuck is between its fully opened and fully closed positions so that the drive dogs are adjacent recess side walls 82. Chuck lock spring 27 is disposed with respect to spring actuator 31 so that lock cam 91 is received by recess 103 of spring actuator 31. That is, front sleeve 18 is in the first (unlocked) position with respect to the nut. In the first position, sleeve lock pawl 88 is disposed adjacent first camming surface 90*a* of sleeve lock projection 90. Rotation of front sleeve 18 in closing direction 97 transfers torque from front sleeve 18 to nut 16 via lock cam 91 being seated in recess 103 of chuck lock pawl 98, and sleeve lock pawl 88 abutting sleeve lock projection 90. Since nut band 22 is rotationally fixed to nut 16 by a press-fit, an operator rotating front sleeve 18 rotationally drives the nut through nut lock spring 27 and sleeve lock spring 29, thereby opening or closing the jaws. When the operator rotates the sleeve/nut band/nut in the closing direction (indicated by arrow 97) to the point that the jaws tighten onto a tool shank, the nut is urged rearward up the jaw threads, thereby pushing the nut against balls 68 of bearing 54, bearing washer 64, and thrust ring 48.

The wedge between the nut threads and jaw threads increasingly resists the nut's rotation. When the operator continues to rotate front sleeve 18 in closing direction 97, and the resistance overcomes the hold provided by both lock pawl 91 being seated in recess 103, and spring lock pawl 88 abutting first camming surface 90*a* of sleeve lock projection 90, front sleeve 18 rotates with respect to nut 16 and both chuck lock spring 27 and sleeve lock spring 29. This moves nut drive dogs 74 from side walls 82 of nut drive recesses 78 to side walls 80 and pushes sleeve lock pawl 88 radially inwardly as it passes over sleeve lock projection 90, coming to rest adjacent its second camming surface 90*b* (FIGS. 7B, 8B and 9B). Simultaneously, cam surface 105 rotates toward lock cam 91 so that lock cam 91 rides up on the cam surface 105, thereby biasing chuck lock pawl 98 inwardly so that locking teeth 100 of the lock pawl engages ratchet teeth 96 of annular ratchet 94, as shown in FIGS. 7B and 9B. At this point, chuck lock spring 27, and therefore nut 16, is rotationally locked to annular ratchet 94, and therefore chuck body 14, against rotation in opening direction 99 of the chuck. That is, the nut is rotationally locked to the chuck body in the opening direction. Since the rotation of the nut with respect to the body is necessary to open the chuck, this resists inadvertent opening during use.

Chuck lock spring 27, and therefore nut 16, may, however, still rotate with respect to annular ratchet 94, and therefore body 14, in the closing direction 97 of the chuck. When the user rotates front sleeve 18, the sleeve drives nut 16 through nut drive dogs 74 against recess side walls 80. This continues to tighten the chuck and, as described above, produces a clicking sound to notify the operator that the chuck is in a fully tightened position.

To open the chuck, the operator rotates front sleeve 18 in opening direction 99. Front sleeve 18 transfers this torque, by way of spring actuator 31, to chuck lock spring 27 at the engagement of lock cam 91 on cam surface 105 and to sleeve lock spring 29 at the engagement of sleeve lock pawl 88 and second camming surface 90*b* of sleeve lock projection 90. Because locking teeth 100 engage annular ratchet 94, which is rotationally fixed to the body via a press-fit, through ratchet teeth 96, the chuck and sleeve lock springs cannot rotate with the front sleeve. Thus, upon application of sufficient torque in the opening direction 99, front sleeve 18 moves with respect to the chuck and sleeve lock springs and the nut. This moves lock cam 91 off of cam surface 105 and back into recess 103, thereby disengaging locking teeth 100 of chuck lock pawl 98 from ratchet teeth 96. Sleeve lock pawl 88 moves over sleeve lock projection from second camming surface 90*b* to first camming surface 90*a*, and nut drive dogs 74 move from side walls 80 to side walls 82 of nut drive recesses 78. Thus, the front sleeve moves to the first position with respect to the nut, as shown in FIGS. 7A, 8A and 9A, and the nut is free to rotate with respect to the annular ratchet and chuck body. Accordingly, further rotation of front sleeve 18 in opening direction 99 moves jaws 26 away from the chuck axis, thereby opening the chuck.

Referring to another embodiment as illustrated in FIGS. 10-12, a chuck 210 in accordance with the present disclosure includes a body 214, a nut 216, a front sleeve 218, a nose piece 220, a nut band 222, a rear cover disk 224, a plurality of jaws 226, a chuck lock and sleeve lock spring 227, and a spring actuator 231. Body 214 is generally cylindrical in shape and comprises a nose or forward section 228 and a tail or reward section 230. Nose section 228 has a front face 232 transverse to the longitudinal center axis 234 of body 214 and a tapered surface at its forward end. The nose section defines an axial bore 238 that is dimensioned somewhat larger than the largest tool shank that the chuck is designed to accommodate. A threaded bore 240 is formed in the tail section and is of a standard size to mate with a drive shaft of a powered or hand driver (not shown). Axial bore 238 and the threaded bore may communicate at a central region of body 214, as described above with respect to FIG. 1.

Body 214 defines three passage ways 242 to accommodate three jaws 226. Each jaw is separated from each adjacent jaw equiangularly about chuck axis 234, and the axes of the jaws are arranged as described above. Threads formed on each jaw's opposite or outer surface, may be constructed in any suitable type pipe and pitch, as described above.

Body 214 includes a thrust ring 248 that, in one or more embodiments, may be integral with the body's main portion. It should be understood, however, that thrust ring 248 and the main body portion may be separate components. Thrust ring 248 includes a plurality of guideways 250 formed around its circumference to permit retraction of jaws 226 therethrough and also includes a rearward ledge to receive a bearing 254 and bearing washer 264. The thrust ring and its ledges are constructed as discussed above with respect to the embodiment of FIG. 1. A front ledge 253 extends radially outward from the body forward of thrust ring 248. Front ledge 253 prevents forward axial motion of nut 216, which is received in an annular groove 257 formed in chuck value 214 between front ledge 253 and thrust 248, relative to body 214.

Body tail section 230 includes a knurled surface 260 that extends entirely about the outer surface of the tail section and receives rear cover disk 224, or an optional rear sleeve (not shown), in a press fit. Rear cover disk 224 could also be retained by press fit without knurling, as described above.

Nut 216, which in the described embodiment is a split nut, defines female threads 262 located on an inner circumference of the nut and is received in annular grove 257 by separate placement of the two nut halves in the grove, as should be understood in this art. A bearing washer 264 is received adjacent a first surface of the thrust ring ledge between thrust ring 248 and bearing 254. Bearing 254 includes the bearing cage that holds a plurality of balls that permit nut 216 to rotate relative to the chuck body. Bearing 254 is disposed between the front surface of bearing 264 and the rear surface of nut 216. Nut 216 is shown without serrations or knurling on its outer circumference, but it should be understood that nut 216 may be formed with axially-aligned teeth, or other forms of knurling, on it's outer circumference, and its front outer edge may be provided with a small chamfer to facilitate the press fitting of nut 216 into nut band 222. Nut 216 may include a ledge 263 extending radially outwardly from its rear end for abutting the reward edge of nut band 222 when the nut band is press-fitted onto nut 216 so that nut 216 is fully inserted into nut band 222.

Nut band 222 includes an annular band portion 272 that surrounds nut 216 in a press-fit. A plurality of nut drive dogs 274 extend forwardly from a forward edge of annular band portion 272 and are received in a corresponding plurality of nut drive recesses 278 that are defined in the outer perimeter of spring actuator 231. Each nut drive dog 274 is limitedly rotatable in its corresponding nut drive recess 278 through a predetermined angle about axis 234 dependent on the difference in angular widths between dogs 274 and recesses 278. In this embodiment, three nut drive dogs 274 and 3 nut drive recesses 278 are provided.

Front sleeve 218 is substantially cylindrical in shape and terminates at its front end with an annular front face that is generally planar in a plane perpendicular longitudinal center axis 234 of chuck body 214. An inner flange extends rearwardly from the innermost perimeter of the front face and includes a plurality of drive dogs extending rearwardly from its front edge in a direction parallel to axis 234, similar to the embodiment described above with respect to FIG. 1. In these embodiments, the front sleeve includes three drive dogs. The front sleeve is rotatably disposed about body 214 and axially retained thereon by nose piece 220, which is in turn pressed onto body forward section 228.

Each drive dog of the front sleeve is received in a respective drive recess 286 defined by spring actuator 231 so that the distal ends of the dogs abut the bottoms of the respective drive recesses 286. The angular width of the drive dogs and recesses 286 are the same (though allowing for a sliding fit of the dogs into the recesses), so that spring actuator 31 is rotationally fixed to front sleeve 218. Each sleeve drive recess 286 extends circumferentially about the inner perimeter of spring actuator 231.

Spring actuator 231 is substantially annular in shape, defining a central bore that is configured to be, and is, rotatably received about forward section 228 of the chuck body. In this embodiment, spring actuator 231 defines three nut drive recesses 278 extending circumferentially about its outer perimeter. Each nut drive recess 278 is configured to receive, and receives, a respective nut drive dog 274 of nut band 222. Additionally, spring actuator 231 defines a plurality of sleeve drive recesses 286, as described above, each sleeve drive recess 286 depending inwardly into the front face of spring actuator 231 and being in communication with a perimeter of its central bore adjacent its innermost perimeter. Spring actuator 231 also includes a sleeve lock projection 290 and a locking cam 291 that depend axially rearwardly from the spring actuator's rear face. Sleeve lock projection 290 extends radially inwardly toward longitudinal center axis 234 of the chuck's body and cooperates with a sleeve lock pawl 288 at one distal end of sleeve and chuck lock spring 227 to maintain front sleeve 218 in a selected rotational position with respect to the nut. Similarly, locking cam 291 also extends radially inwardly toward longitudinal center axis 234 of the front sleeve and is selectively engageable with a lock pawl 298 of chuck and sleeve lock spring 227 to transition chuck 210 between the locked and unlocked states, as discussed below. Spring actuator 231 may be formed from a metal such as, but not limited to, spring steel.

Chuck and sleeve lock spring 227 is substantially C-shaped and includes a body portion 309 that is thicker in the radial direction (with respect to the chuck body axis) than a deflectable chuck lock pawl 298 extending circumferentially from a first end of the body portion. Body portion 309 of chuck and sleeve lock spring 227 includes a mounting recess 301 that depends radially inwardly (toward axis 234, considered in the assembled chuck) from the spring's outer surface 307 and that has an angular width sufficient to allow recess 301 to slideably receive a respective nut drive dog 274 of nut band 222 therein but otherwise approximately equaling the angular width of dog 274, thereby rotationally fixing chuck lock spring 227 to nut band 222 so that the two components rotate together during the chuck's operation as described herein. Because nut band 222 is pressed to nut 216, chuck and sleeve lock spring 227 is therefore rotationally fixed to nut 16. A distal end of chuck lock pawl 298 is disposed radially inwardly of one of the nut drive dogs 274. In this embodiment, chuck lock pawl 298 is thinner in the radial direction (with respect to axis 34), than is body portion 309, thereby accommodating lock cam 291 of spring actuator 231 to cam chuck lock pawl 298 radially inwardly, as discussed in greater detail below.

The spring body in this example is configured to provide sufficient stiffness to resist the chuck's opening when teeth 300 engage teeth 296 and also to resist fatigue or repeated operation as discussed herein. In this instance, the spring's dimensions are slightly greater in the radial and axial directions, as compared to the dimensions of spring 27 in the embodiments described above to thereby increase lock force. More lock teeth 300, in this example five, are used in this embodiment in order to reduce tooth wear under the higher lock force. As should be understood in view of the present disclosure, spring 227 repeatedly flexes in the radial direction during locking and unlocking of the chuck, in and out of engagement between locking teeth 300 and ratchet teeth 296. Body portion 309 flexes slightly in the chuck's operation as to described herein, as spring 227 has a long length, extending in the presently described embodiment more than half about the chuck body. Also, spring 227 generally has a width (i.e. in the direction of the chuck axis) in its body portion that is greater than the spring body's thickness (i.e. in the chuck body's radial direction). Given the parameters of the spring and the construction of a given chuck embodiment as described herein, the particular spring dimensions, e.g. axial width, radial thickness, and arcuate length may be adjusted until achieving a desired operating parameter, e.g. the level of torque needed to be applied by the user's grip on the front sleeve in the opening direction to move sleeve 18 in the opening direction from a locked position (as shown in FIGS. 7B, 8B, and 9B in the two-spring embodiment) to an unlocked position (as shown in FIGS. 7A, 8A, 9A, and 11). Thus, the spring dimensions can be adjusted within a given chuck configuration until a desired opening torque is achieved, e.g. at or about thirty inch-pounds. It will therefore be understood in view of the present disclosure that the particular spring dimensions can vary with the chuck dimensions and configuration, the desired chuck parameter (e.g. opening torque level), and the desired threshold for that parameter (e.g. at or about thirty inch-pounds).

Chuck lock pawl 298 includes, as noted, a plurality of lock teeth 300 depending radially inwardly therefrom that are selectably engageable with ratchet teeth 296 of an annular ratchet ring 294 that is pressed onto the chuck's body 214 forward of front ledge 253. As noted, five teeth 300 are provided, to increase the spring's ability to hold the rotational lock described herein, with teeth 296. While five teeth are illustrated, other numbers of teeth may be used in other embodiments. Chuck and sleeve lock spring 227 is preferably formed from a metal such as, but not limited to, spring steel. It will be understood from the present disclosure that other materials, for example but not limited to beryllium bronze, could be used to form the springs or other components discussed herein.

Chuck and sleeve lock spring 227 also has a sleeve lock pawl 288 extending circumferentially from one end of spring body portion 309. An outer surface of chuck and sleeve lock spring 227 abuts an inner surface of one of the nut drive dogs 274 adjacent the base of lock pawl 288. In the illustrated embodiments, sleeve lock pawl 288 is thinner in the radial direction than is spring body portion 309, thereby accommodating sleeve lock projection 290 of spring actuator 231 to cam sleeve lock pawl 288 radially inwardly by the sleeve lock projection's first and second camming surfaces 290a and 290b.

As noted, nut drive dogs 274 of nut band 222 are received in respective nut drive recesses 278 defined by spring actuator 231. Each nut drive recess 278 extends circumferentially about the outer perimeter of spring actuator 231. The angular width of each nut drive dog 274 is less than that of its corresponding nut drive recess 278, resulting in a limited range of allowed relative rotational movement between sleeve 218, to which spring actuator 231 is rotationally fixed as described above, and nut 216. Thus, front sleeve 218 and, therefore, spring actuator 231 are also rotatable through the same limited range with respect to chuck and sleeve lock spring 227, as discussed below. For example, front sleeve 218 is rotatable in this example with respect to nut 216, between about 16° and about 20°. Each nut drive recess 278 has a pair of opposed sidewalls 280 and 282 adapted to be selectively abutted by respective nut drive dogs 274 to thereby define the range of the limited allowed relative rotational movement.

Due to the approximately equal angular widths of the drive dogs of front sleeve 218 and drive recesses 286 of spring actuator 231, the application of torque to front sleeve 218 about chuck axis 234 applies same-direction torque to spring actuator 231. Front sleeve 218 transfers torque to nut 216 through engagement of sleeve lock pawl 288 and chuck lock pawl 298 with sleeve projection 290 and locking cam 291 of spring actuator 231, respectively. Accordingly, rotational torque applied to front sleeve 218 is transferred either through such engagement to nut band 222 and, therefore, nut 216 (via the press fit between nut band 222 and nut 216), or through engagement of nut drive dogs 274 with side walls 280 and 282 of nut drive recesses 278. Thus, rotation of front sleeve 218 in the chuck's opening or closing direction about axis 234 also rotates nut 216 in the same opening or closing direction. Due to the thread direction of threads 262, rotation of nut 216 in a first, or closing, rotational direction about axis 234 causes jaws 226 to move radially inward toward axis 234, while rotation of nut 216 in a second, or opening, rotational direction about axis 234 causes jaws 226 to move radially away from axis 234 in respective passageways 242.

As noted above, the ratchet in the form of annular ratchet ring 294 is pressed onto body 14 forward of front ledge 253. In alternate embodiments, the ratchet ring may be formed by teeth inwardly formed in the body. The ratchet in the presently-described embodiment is formed by a plurality of saw tooth-shaped ratchet teeth 296 disposed about ring 294, and thereby about the surface of the chuck's body. Chuck and sleeve lock spring 227 is rotationally fixed to nut band 222 and is biased radially outward from annular ratchet 294, thereby urging a distal end, or lock pawl 298, of spring 227 away from the annular array of ratchet teeth 296. The pawl teeth and the ratchet teeth in this embodiment are formed similarly to the pawl teeth and ratchet teeth described in the embodiments above so that these components perform in the same manner as described with regard to those embodiments.

When front sleeve 218 is in the locked position with respect to the nut, lock cam 291 of spring actuator 231 is received on cam surface 305, which is adjacent a recess 303 of lock pawl 298, and sleeve lock pawl 288 is positioned adjacent a second camming surface 290b of sleeve lock projection 290. Accordingly, locking teeth 300 of lock pawl 298 are forced inwardly and engage ratchet teeth 296. Sleeve and chuck lock spring 227 and, therefore, nut 216 can therefore rotate only in the closing direction with respect to the chuck body. As noted herein, teeth 296 and 300 are configured so that when engaged, the engaged teeth prevent the nuts rotation in the opening direction with respect to the chuck body but allow the nut's rotation in the closing direction, provided sufficient torque is applied to the nut (for example by application of hand-delivered torque to the sleeve) to cause teeth 296 and 300 to ride over each other. It will also be noted that camming surface 290b forms a depression or notch, in the radial direction, in sleeve lock projection 290. Since distal end/pawl 288 is received in this notch, and is biased radially outward into the notch by the spring body, the force of that bias, in combination with the geometry of notch 290b and pawl 288, holds the sleeve rotationally positioned with respect to the nut and body, preventing the sleeve's inadvertent rotation in the opening direction with respect to the nut and the body that could otherwise cause the sleeve to move to the open position relative to the nut and body, which would in turn release the engagement of teeth 296 and 300 and possibly allow the nut to move in the opening direction with respect to the chuck body. Thus, the engagement of pawl 288 and notch 290b resists the sleeve's movement with respect to the nut in the opening direction.

When a user grips front sleeve 218 and applies a predetermined torque (for example, at least 30 inch-pounds in presently-described examples) to the sleeve in the opening direction, sleeve 218 moves in the opening direction with respect to the chuck body from the locked position, and sleeve lock pawl 288 passes over sleeve lock projection 290 from second camming surface 290b until it is adjacent first camming surface 290a. As well, lock cam 291 rides off of cam surface 305 and into recess 303 of chuck lock pawl 298. With the springs in these positions, the chuck is in the unlocked condition as shown in FIG. 12. This allows the spring to return chuck lock pawl 298 to its normal, outwardly biased position, thereby disengaging its locking teeth 300 from ratchet teeth 296 of annular ratchet 294. Thus, chuck and sleeve lock spring 227 and, therefore, nut 216 are again free to rotate with respect to chuck body 214. Continued rotation of front sleeve 218 in the opening direction causes the rotation of nut 216 in the opening direction, thereby causing jaws 226 to move rearwardly within their respective passageways 242 of chuck body 214.

When front sleeve 218, and therefore spring actuator 231, rotate with respect to the chuck body and nut 216 in the opening direction so that lock cam 291 and sleeve lock pawl 288 move from the locked positions to the unlocked positions, nut drive recesses 278 of spring actuator 231 move with respect to nut drive dogs 274 so that each nut drive dog 274 is against or immediately adjacent to the side wall 282 of the respective nut drive recess 278.

Accordingly, and as is apparent from the present discussion, the operation of the chuck illustrated in FIGS. 10-12 in the opening and closing processes is similar to the operation of the chuck illustrated in FIGS. 1-9 except that the sleeve and lock pawls are disposed on a single spring, rather than individual, distinct springs.

While one or more embodiments of the present image have been described above, it should be understood that any and all equivalent realizations of the present invention are included within the scope and spirit of the present disclosure. Thus, the depicted embodiments are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the present disclosure.

What is claimed is:

1. A chuck for use with a manual or powered driver having a rotatable drive shaft, the chuck comprising:

a body configured to rotate with the drive shaft and having an axial bore formed therein centered about an axis of the body;

a plurality of first teeth rotationally fixed to the body;

a plurality of jaws movably disposed with respect to the body in communication with the axial bore;

an annular nut having threads formed thereon in engagement with threads on the jaws so that rotation of the nut about the body and the axis in a closing direction moves the jaws toward the axis and rotation of the nut about the body and the axis in an opening direction, opposite the closing direction, moves the jaws away from the axis;

a spring assembly comprising
  a first annular spring rotationally fixed to the nut and having a body that biases a first distal end of the first annular spring in a radial direction with respect to the axis and that extends over an angular width about the axis that is greater than 180° in a plane perpendicular to the axis, and wherein the first annular spring defines at least one second tooth at the first distal end opposing the first teeth, and
  a second annular spring rotationally fixed to the nut and having a body that biases a second distal end of the second annular spring in a radial direction with respect to the axis and that extends over an angular width about the axis that is greater than 180° in a plane perpendicular to the axis;

a hand actuatable sleeve that surrounds the body, the first annular spring, and the second annular spring about the axis and that engages the nut so that the sleeve rotationally drives the nut in the opening and closing directions and so that the sleeve is rotatable with respect to the nut over a limited arc between first and second relative rotational positions, wherein the sleeve defines a cam surface that engages the first spring so that in the first relative rotational position between the sleeve and the nut, the first teeth and the at least one second tooth are disengaged and so that in the second relative rotational position between the sleeve and the nut, the first teeth and the at least one second tooth are engaged, and wherein the first teeth and the at least one second tooth are configured so that engagement of the first teeth and the at least one second tooth prevents relative rotation between the nut and the body in the opening direction, wherein the sleeve defines a notch that engages the second spring so that in the second relative rotational position between the sleeve and the nut, the notch receives the second distal end so that the notch resists relative rotational movement between the sleeve and the second spring in the opening direction.

2. The chuck as in claim 1, wherein the first teeth and the at least one second tooth are configured so that engagement of the first teeth and the at least one second tooth permits relative rotation between the nut and the body in the closing direction.

3. The chuck as in claim 1, wherein the nut has a plurality of dogs that extend into respective recesses in the sleeve, and wherein the angular width of the dogs, about the axis in a plane perpendicular to the axis, is less than the angular width of the respective recesses so that the difference in angular width between the dogs and the respective recesses defines the limited arc.

4. The chuck as in claim 3, wherein the nut is comprised of an inner portion that defines the threads of the annular nut and a band pressed onto a radially outward surface of the inner portion, the band defining the dogs.

5. The chuck as in claim 4, wherein the sleeve has a polymer portion and a metal portion received at a surface of the polymer portion that faces radially inward with respect to the axis, wherein the metal portion defines at least part of the respective recesses.

6. The chuck as in claim 5, wherein the metal portion defines at least part of the cam surface and at least part of the notch.

7. The chuck as in claim 1, wherein the spring assembly and the sleeve are configured so that the spring assembly and the sleeve resist relative rotation between the sleeve and the spring assembly in response to torque applied to the sleeve in the opening direction with respect to the nut up to a said torque of at least about thirty inch-pounds.

8. The chuck as in claim 1, wherein the spring assembly and the sleeve are configured so that the spring assembly and the sleeve resist relative rotation between the sleeve and the spring assembly in response to torque applied to the sleeve in the opening direction with respect to the nut up to a said torque of at least thirty inch-pounds.

9. A chuck for use with a manual or powered driver having a rotatable drive shaft, the chuck comprising:
   a body configured to rotate with the drive shaft and having an axial bore formed therein centered about an axis of the body;
   a plurality of first teeth rotationally fixed to the body;
   a plurality of jaws movably disposed with respect to the body in communication with the axial bore;
   an annular nut having threads formed thereon in engagement with threads on the jaws so that rotation of the nut about the body and the axis in a closing direction moves the jaws toward the axis and rotation of the nut about the body and the axis in an opening direction, opposite the closing direction, moves the jaws away from the axis;
   a spring assembly rotationally fixed to the nut that has at least one second tooth opposing the first teeth, that biases the at least one second tooth in a radial direction with respect to the axis, and that biases an end of the spring assembly in a radial direction with respect to the axis;
   a hand actuatable sleeve that surrounds the body and the spring assembly about the axis and that engages the nut so that the sleeve rotationally drives the nut in the opening and closing directions and so that the sleeve is rotatable with respect to the nut over a limited arc between first and second relative rotational positions,
   wherein the sleeve defines a cam surface that engages the spring assembly so that in the first relative rotational position between the sleeve and the nut, the first teeth and the at least one second tooth are disengaged and so that in the second relative rotational position between the sleeve and the nut, the first teeth and the at least one second tooth are engaged, and wherein the first teeth and the at least one second tooth are configured so that engagement of the first teeth and the at least one second tooth prevents relative rotation between the nut and the body in the opening direction,
   wherein the sleeve defines a notch that engages the spring assembly so that in the second relative rotational position between the sleeve and the nut, the notch receives the end of the spring assembly so that the notch resists relative rotational movement between the sleeve and the spring assembly in the opening direction,
   wherein the nut has a plurality of dogs that extend into respective recesses in the sleeve, and wherein the angular width of the dogs, about the axis in a plane perpendicular to the axis, is less than the angular width of the respective recesses so that the difference in angular width between the dogs and the respective recesses defines the limited arc, and
   wherein the sleeve has a polymer portion and a metal portion received at a surface of the polymer portion that faces radially inward with respect to the axis, wherein the metal portion defines at least part of the respective recesses.

10. The chuck as in claim 9, wherein the metal portion defines at least part of the cam surface and at least part of the notch.

11. The chuck as in claim 9, wherein the spring assembly and the sleeve are configured so that the spring assembly and the sleeve resist relative rotation between the sleeve and the spring assembly in response to torque applied to the sleeve in the opening direction with respect to the nut up to a said torque of at least about thirty inch-pounds.

12. The chuck as in claim 9, wherein the spring assembly and the sleeve are configured so that the spring assembly and the sleeve resist relative rotation between the sleeve and the spring assembly in response to torque applied to the sleeve in the opening direction with respect to the nut up to a said torque of at least thirty inch-pounds.

13. The chuck as in claim 9, wherein the spring assembly comprises a first spring that defines the at least one second tooth and a second spring that defines the end.

14. The chuck as in claim 9, wherein the spring assembly comprises a single spring that defines the at least one second tooth and the end.

15. A chuck for use with a manual or powered driver having a rotatable drive shaft, the chuck comprising:
    a body configured to rotate with the drive shaft and having an axial bore formed therein centered about an axis of the body;
    a plurality of first teeth rotationally fixed to the body;
    a plurality of jaws movably disposed with respect to the body in communication with the axial bore;
    an annular nut having threads formed thereon in engagement with threads on the jaws so that rotation of the nut about the body and the axis in a closing direction moves the jaws toward the axis and rotation of the nut about the body and the axis in an opening direction, opposite the closing direction, moves the jaws away from the axis;
    a spring assembly comprising
      a first annular spring rotationally fixed to the nut by a dog that extends from the nut and cooperates with a groove in the first spring, the first spring having a body that biases a first distal end of the first annular spring in a radial direction with respect to the axis and that extends over an angular width about the axis that is greater than 180° in a plane perpendicular to the axis, and wherein the first annular spring defines at least one second tooth at the first distal end opposing the first teeth, and
      a second annular spring rotationally fixed to the nut by the dog that cooperates with a groove in the second spring, the second spring having a body that biases a second distal end of the second annular spring in a radial direction with respect to the axis and that extends over an angular width about the axis that is greater than 180° in a plane perpendicular to the axis;

a hand actuatable sleeve that surrounds the generally cylindrical body, the first annular spring, and the second annular spring about the axis and that engages the nut so that the sleeve rotationally drives the nut in the opening and closing directions and so that the sleeve is rotatable with respect to the nut over a limited arc between first and second relative rotational positions, wherein the sleeve defines a cam surface that engages the first spring so that in the first relative rotational position between the sleeve and the nut, the first teeth and the at least one second tooth are disengaged and so that in the second relative rotational position between the sleeve and the nut, the first teeth and the at least one second tooth are engaged, and wherein the first teeth and the at least one second tooth are configured so that engagement of the first teeth and the at least one second tooth prevents relative rotation between the nut and the generally cylindrical body in the opening direction, wherein the sleeve defines a notch that engages the second spring so that in the second relative rotational position between the sleeve and the nut, the notch receives the second distal end so that the notch resists relative rotational movement between the sleeve and the second spring in the opening direction.

16. The chuck as in claim 15, wherein the first annular spring and the second annular spring are in abutting relationship in the axial direction of the chuck body.

17. The chuck as in claim 15, wherein the spring assembly and the sleeve are configured so that the spring assembly and the sleeve resist relative rotation between the sleeve and the spring assembly in response to torque applied to the sleeve in the opening direction with respect to the nut up to a said torque of at least about thirty inch-pounds.

18. The chuck as in claim 15, wherein the spring assembly and the sleeve are configured so that the spring assembly and the sleeve resist relative rotation between the sleeve and the spring assembly in response to torque applied to the sleeve in the opening direction with respect to the nut up to a said torque of at least thirty inch-pounds.

* * * * *